(12) United States Patent
Meyer

(10) Patent No.: US 7,767,905 B2
(45) Date of Patent: Aug. 3, 2010

(54) ELECTRICAL APPARATUS HAVING QUICK CONNECT COMPONENTS

(76) Inventor: Mark H. Meyer, 10289 Paradise Valley Dr., Conroe, TX (US) 77304

( * ) Notice: Subject to any disclaimer, the term of this patent is extended or adjusted under 35 U.S.C. 154(b) by 0 days.

(21) Appl. No.: 12/111,271

(22) Filed: Jun. 20, 2008

(65) Prior Publication Data

US 2009/0107693 A1 Apr. 30, 2009

Related U.S. Application Data

(60) Provisional application No. 60/984,072, filed on Oct. 31, 2007.

(51) Int. Cl.
H02G 3/18 (2006.01)
(52) U.S. Cl. .............. 174/60; 174/50; 174/57; 174/58; 174/135; 220/4.02; 439/535; 248/906; 361/640
(58) Field of Classification Search ............ 174/50, 174/57, 58, 60, 67, 135; 220/4.02; 439/535; 248/906; 361/640
See application file for complete search history.

(56) References Cited

U.S. PATENT DOCUMENTS

| | | | |
|---|---|---|---|
| 2,934,590 A | 4/1960 | Thompson et al. | |
| 3,510,822 A | 5/1970 | Patterson | |
| 3,749,873 A | 7/1973 | Harper et al. | |
| 3,922,478 A | 11/1975 | Perkey | |
| 4,062,470 A | 12/1977 | Boteler | |
| 4,063,660 A | 12/1977 | Ware | |
| 4,140,293 A | 2/1979 | Hansen | |
| 4,165,443 A | 8/1979 | Figart et al. | |
| 4,194,644 A | 3/1980 | Narvaez | |
| 4,295,018 A | 10/1981 | Borrelli | |
| 4,336,418 A | 6/1982 | Hoag | |
| 4,500,746 A | 2/1985 | Meehan | |
| 4,548,132 A * | 10/1985 | Moon ......................... | 100/52 |
| 4,602,382 A * | 7/1986 | Gabbay et al. .............. | 381/391 |
| 4,626,617 A | 12/1986 | Rye | |
| 4,631,354 A | 12/1986 | Boteler | |
| 4,673,097 A | 6/1987 | Schuldt et al. | |
| 4,747,506 A | 5/1988 | Stuchlik, III | |
| 4,794,207 A | 12/1988 | Norrberg | |
| 4,918,258 A | 4/1990 | Ayer | |
| 4,952,754 A | 8/1990 | Rye | |
| 4,958,048 A | 9/1990 | Bell | |
| 4,981,439 A | 1/1991 | Piedmont | |

(Continued)

OTHER PUBLICATIONS

International Search Report issued Jan. 26, 2009, during the prosecution of International Application No. PCT/US2008/81849.

(Continued)

*Primary Examiner*—Dhiru R Patel
(74) *Attorney, Agent, or Firm*—Fulbright & Jaworski, L.L.P.

(57) ABSTRACT

Methods and apparatuses for power distribution improve and can standardize electrical connections between electrical cables and the multitude of electrical switches, receptacles, and fixtures of known technology. The invention can include modular hardware components such as junction boxes, electrical devices, adaptors, a/b switches, etc. that simplify both installation and inspection requirements at the job site. Optional color coding can facilitate proper wiring of the components. The invention allows field wiring to be completed more quickly and accurately thereby advantageously reducing associated costs and increasing safety.

13 Claims, 14 Drawing Sheets

U.S. PATENT DOCUMENTS

| | | | |
|---|---|---|---|
| 5,223,673 | A | 6/1993 | Mason |
| 5,380,951 | A | 1/1995 | Comerci et al. |
| 5,399,806 | A | 3/1995 | Olson |
| 5,471,012 | A | 11/1995 | Opel |
| 5,525,754 | A | 6/1996 | Akins et al. |
| 5,562,222 | A | 10/1996 | Jordan et al. |
| 5,684,789 | A | 11/1997 | Habeck et al. |
| 5,785,551 | A | 7/1998 | Libby |
| 5,925,850 | A | 7/1999 | Park |
| 5,975,938 | A | 11/1999 | Libby |
| 6,051,798 | A | 4/2000 | Mittal |
| 6,156,971 | A | 12/2000 | May |
| 6,201,187 | B1 | 3/2001 | Burbine |
| 6,232,553 | B1 | 5/2001 | Regen |
| 6,449,768 | B1 | 9/2002 | Oftedahl et al. |
| 6,465,735 | B2 | 10/2002 | May |
| 6,527,598 | B1 | 3/2003 | Opel |
| 6,544,049 | B1 | 4/2003 | Pierson |
| 6,558,190 | B1 | 5/2003 | Pierson |
| 6,563,049 | B2 | 5/2003 | May |
| 6,617,511 | B2 | 9/2003 | Schultz et al. |
| 6,650,199 | B2 | 11/2003 | Dobrovolny |
| 6,730,844 | B2 | 5/2004 | Reiker |
| 6,737,576 | B1 | 5/2004 | Dinh |
| 6,739,919 | B2 | 5/2004 | Murahami et al. |
| 7,160,147 | B1 | 1/2007 | Stephan |
| 2002/0100599 | A1 | 8/2002 | Rittmann et al. |
| 2005/0032401 | A1 | 2/2005 | Kobayashi |
| 2006/0037773 | A1 | 2/2006 | Castaldo et al. |
| 2006/0228947 | A1 | 10/2006 | Landis et al. |
| 2007/0007027 | A1 | 1/2007 | De La Borbolla |

OTHER PUBLICATIONS

Written Opinion issued Jan. 26, 2009, during the prosecution of International Application No. PCT/US2008/81849.

* cited by examiner

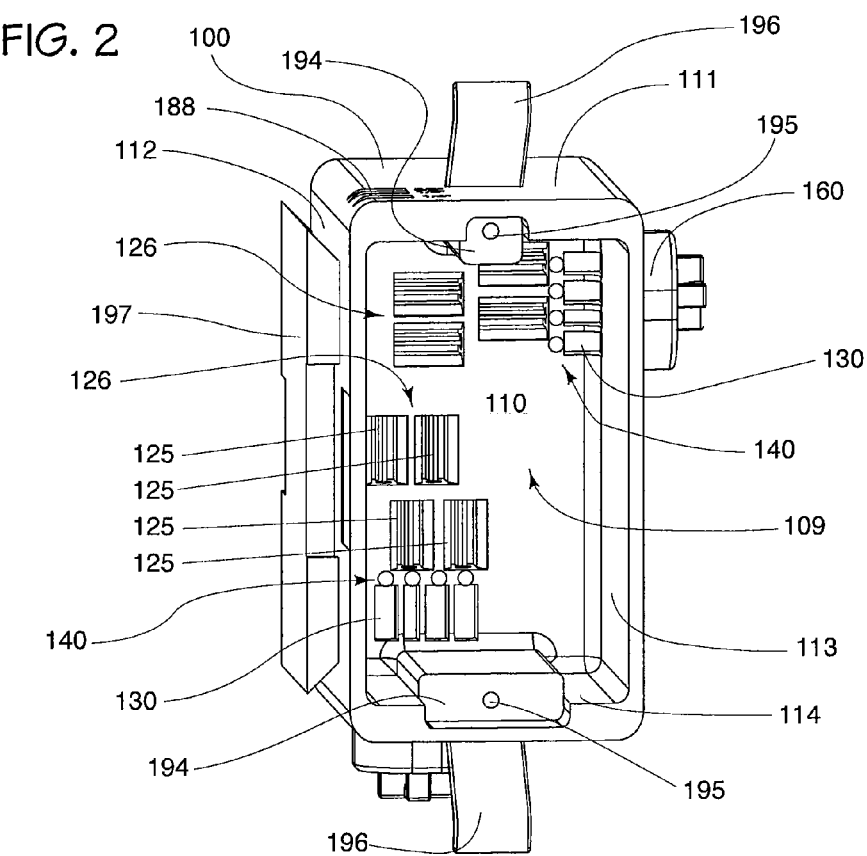

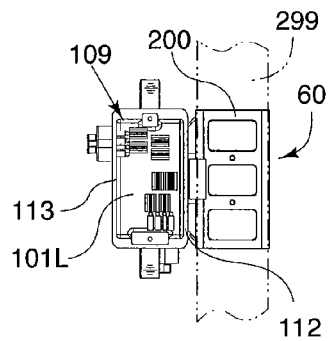
FIG. 7L1
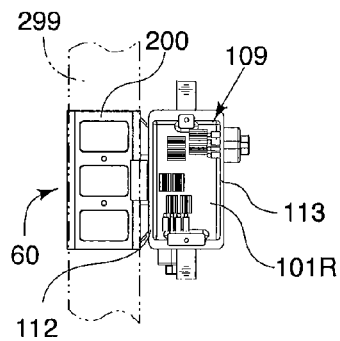
FIG. 7R1
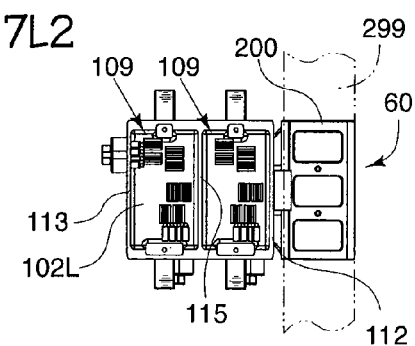
FIG. 7L2
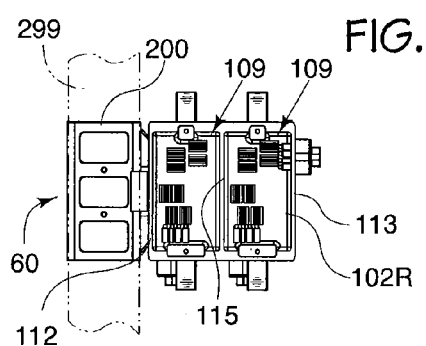
FIG. 7R2
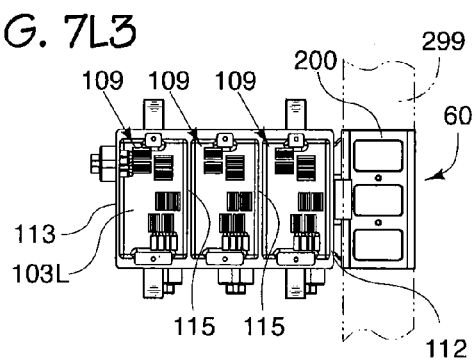
FIG. 7L3
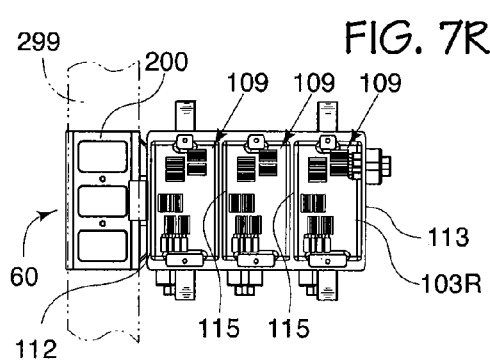
FIG. 7R3
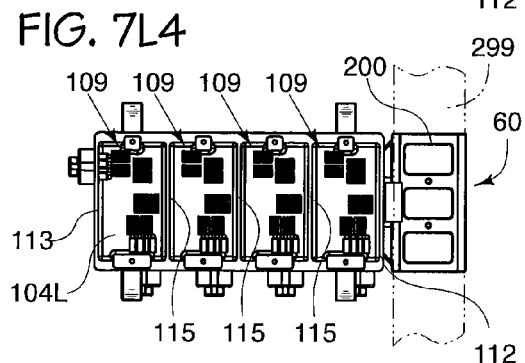
FIG. 7L4
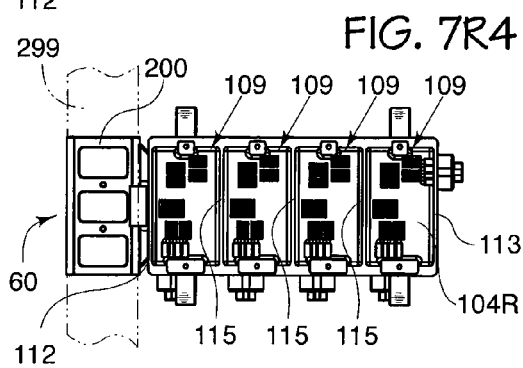
FIG. 7R4

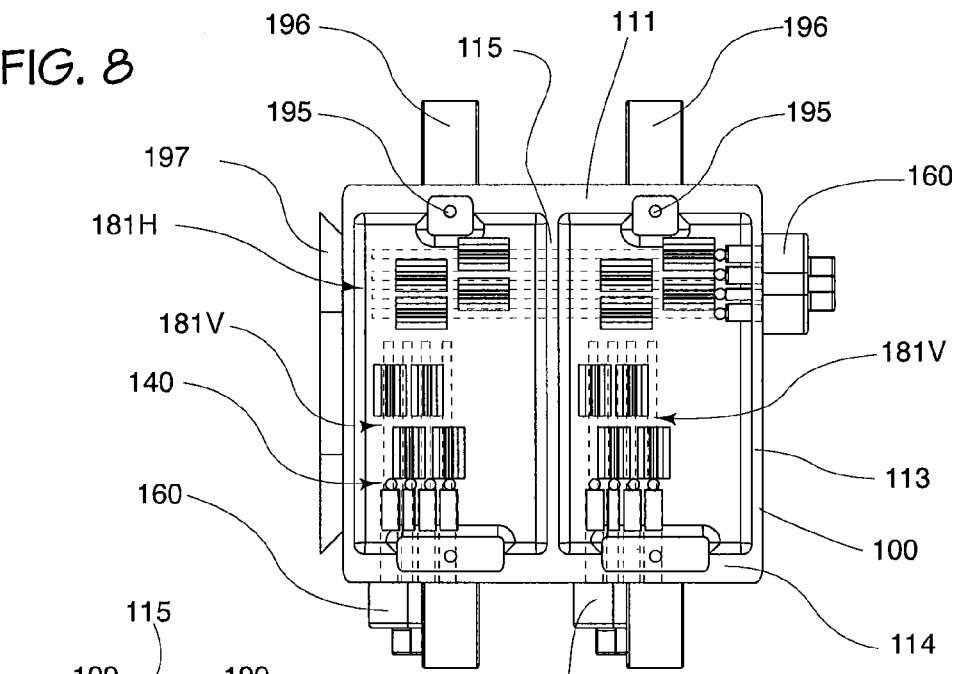
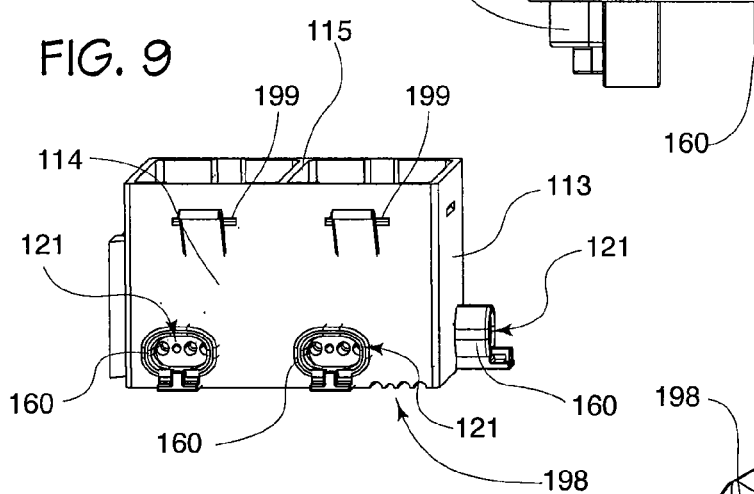
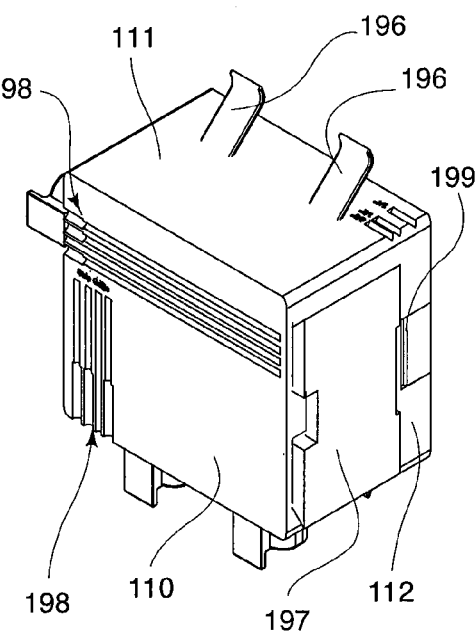
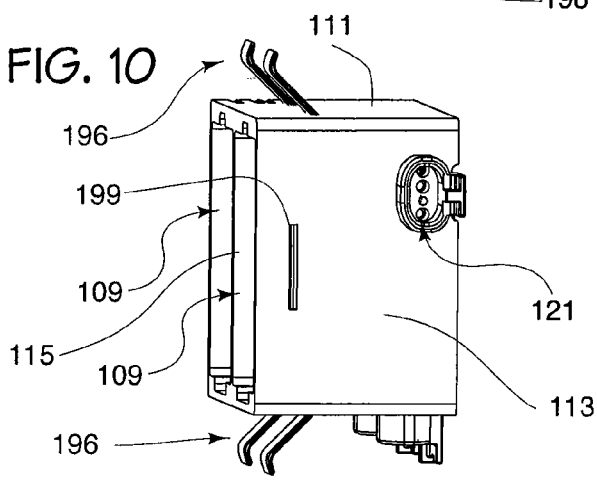

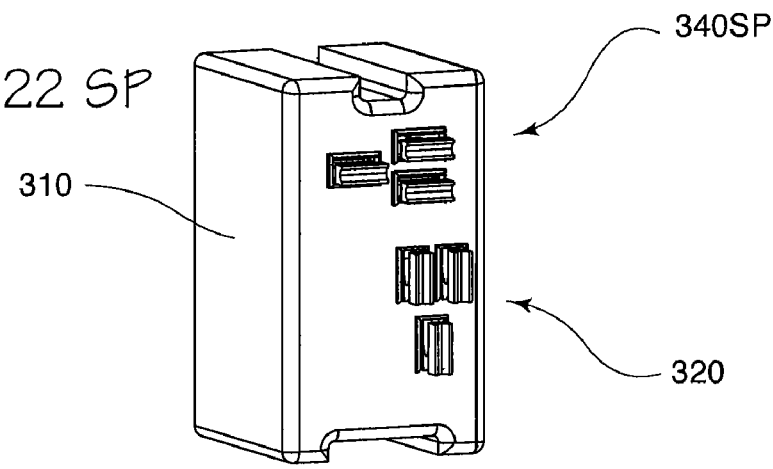
FIG. 22 SP
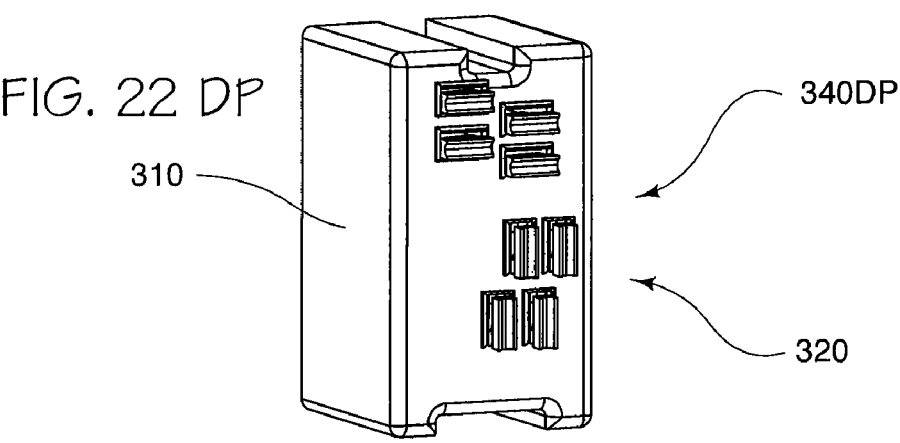
FIG. 22 DP
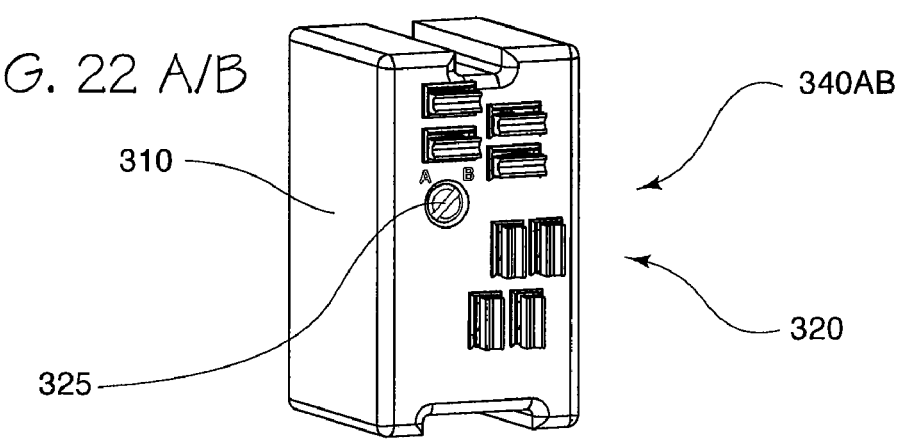
FIG. 22 A/B

ELECTRICAL APPARATUS HAVING QUICK CONNECT COMPONENTS

CROSS-REFERENCE TO RELATED APPLICATIONS

This application claims priority to U.S. Provisional Patent application Ser. No. 60/984,072 filed on Oct. 31, 2007, entitled "ELECTRICAL APPARATUS HAVING QUICK CONNECT COMPONENTS", which is incorporated herein by reference in its entirety.

TECHNICAL FIELD

This invention generally relates to iconoclastic methods and apparatuses for standardization for the electrical industry. More specifically, it relates to improved methodology and apparatuses for wiring connections that can be used for electrical switches, receptacles, and fixtures of known technology effecting the distribution of electrical power in buildings such as homes, factories, or other industrial structures.

BACKGROUND OF THE INVENTION

Previously it took considerable skill, experience, and knowledge to proficiently and safely wire the multitude of electrical devices in an average home. Hundreds of companies manufacture thousands of different types of switches, dimmers, sensors, receptacles, and the like. This multiplicity has produced a wide variety of connection standardization issues. These issues are compounded by the requirement that many of these components must be wired in several different ways, even within the same circuit, to produce a specific desired outcome. An example of this is a three-way switch. This diverse conglomeration of wiring schemes and connection methods adds to the complexity of industry standardization issues. This invention provides a methodology and a common bridge between the thousands of devices on the market today and their least common denominator; the power source wires.

Previously this lack of connection standardization would increase the probability of wiring errors in the field. Licensed electricians, their assistants, amateur electricians, and even homeowners bring a wide range of expertise to a wiring project. Knowledge of code requirements and best practice procedures tend to differ widely between installers, thus producing inconsistent results and errors. These wiring errors range from burdensome inconveniences to life threatening safety issues. Even minor field wiring errors would impact both the safety and the profitability of every job. Notwithstanding the significant need for the industry to address these problems, no adequate solution has been universal enough to address the industry needs until the present invention. This invention minimizes field-wiring requirements for thousands of different types of switches, dimmers, sensors, receptacles, and the like being manufactured throughout the world.

Previously electrical equipment such as receptacles, switches, dimmers and the like were installed by hand-wiring operations. Hand wiring requires the expensive services of electricians utilizing procedures that differ only slightly from the procedures in use for over fifty years. Hand wiring is extremely time-consuming and since the hourly wage of electricians is among the highest of all craftsmen, the cost of installing the electrical distribution system in a building represents a substantial portion of the total building cost. This problem has been partially solved by the implementation of some specific function devices, but these devices still have significant problems and all of them fail to address the needs of the entire industry. In addition, all previous attempts to invent pre-wired junction boxes have been complicated and expensive, as exemplified in U.S. Pat. Nos. 6,201,186; 5,525,754; 4,336,418; and 4,165,443.

Previously the number of connections that had to be made and housed within the box determined the interior size of the electrical box, compounding the complexity of industry standardization issues. Electricians in the field were required to stock a wide variety of electrical box sizes, depths, and styles to meet code requirements.

Previously good practice, and the National Electrical Code (NEC), would require a full eight inches of wire of each and every wire pulled into an electrical box. This extra wire would then be used for connection requirements within the electrical box. A large portion of this wire would be cut away and discarded as scrap when connections were eventually made. Over time, this scrap would equate to a considerable expense, considering the amount of connections required during a typical construction project and the ever rising cost of copper.

Previously the preferred method of joining various wires within a traditional electrical box was through the use of twist-on wire connectors. While twist-on wire connectors work well when joining two like wires, they are less reliable and more difficult to use in joining wires of differing gauges and construction. Consequently, such electrical connections must often be soldered or taped prior to the application of the twist-on wire connector. This was a significant cost in time and materials. In addition, electricians in the field were required to stock a wide variety of twist-on wire connector sizes and styles to meet code requirements.

Previously the wire that remained as part of the connection would have to be stripped, twisted, capped, or otherwise connected to other wires or switches associated with that box. Those wires and connection caps would then have to be compressed and forced into the electrical box in such a way to allow space for the switches to be installed and aligned within the same box.

Previously connections that were sound in a static condition would often become compromised when the wires were twisted, turned, and compressed into their electrical box. Those compromised connections would commonly fail and tend to go unnoticed until electrical power was established. It was typical to run a troubleshooting regiment to recheck all connections after the system was powered up. This added step would come at a cost of both time and resources. A troubleshooting regiment would require a period of operation in a potentiality unsafe condition.

Previously electrical inspectors had to rely on random sampling during on-site job inspections. It was not practical, from a time and resources point of view, to inspect each electrical box for correct and sound wiring connections. In fact, the process of pulling a switch from its electrical box for inspection and then replacing it could, in itself, be the cause of a connection failure.

Previously, after the wires were pulled into the electrical boxes, time was required to presort the wires within the box. Ground wires were typically ganged, twisted, and capped. Neutral wires were striped, ganged, twisted and capped. The hot feeds, common, and/or traveler wires were typically stripped at this time as well. All wires were then coiled up and shoved into the electrical box to facilitate sheetrock installation.

Previously the interior of the connection boxes and all wires within could become contaminated by sheetrock material, dust, and other construction debris. The wires would become contaminated further by overspray when the wall texture was sprayed on the walls and yet again when the paint was sprayed or rolled onto the walls and ceilings. Electrical code, and good practice, requires that each wire be clean prior to making its final connection to a switch or receptacle. This would result in a significant amount of time being spent by the electrician to clean out the electrical box, as well as each individual wire in the box. In common field practice, the electrician typically scrapes each individual wire with an emery cloth or at least a fingernail to ensure a good contact.

Previously, once the sheetrock was in place, the electrician would not be able to visually identify which wire would lead to which location. After the sheetrock was installed, additional time was required to sort and identify the hot feeds, common, and traveler wires prior to connecting them to their respective switches. This was time consuming and a daunting task for less experienced installers.

Previously, both the professional and amateur electrician often experienced difficulty in connecting devices with stranded wire leads to solid stiff wire leads. Soldering and pre-taping the wires was time consuming and was therefore rarely used. Accordingly, just the twist-on wire connector was relied upon to maintain the connection. These interconnections commonly failed as the wires were compressed and forced into the confined space of a traditional electrical box.

Previously a common problem would present itself when the electrical box was not properly secured to its respective supporting stud or other support. In addition, secure electrical boxes often become loose when their respective electrical wires were pushed, pulled, twisted, and compressed within the box. Another common problem presented itself when the secure fit of an electrical box was compromised during the sheetrock process. Most electrical boxes are offset forward of their respective stud to allow for the thickness of the wall surface, typically sheetrock. When the sheet rock is installed, large panels of sheet rock can be slammed up against the electrical box as the installers hammer or screw the sheetrock in place. Cutout tools are then used to remove the sheetrock from in front of the box allowing access to the box. This process often repositions the electrical box. They can be knocked askew and become less secure in the process. Proper stabilization of the now compromised electrical box would typically require removal of the sheetrock, greatly disfiguring the area around the box, and is very labor-intensive and time consuming. Unfortunately, this has given rise to a common field practice whereby the electrician will attempt to semi-secure the electrical box by simply compressing the sheetrock between the switch head and the electrical box and then covering the evidence of a code violation with the faceplate. While this method is less desirable, it is quick and prevents the removal of the sheetrock to reattach the electrical box.

Previously another problem was manifested when an electrical box was attached to the supporting stud too far back into the wall cavity, thus leaving an unacceptable space between the electrical box and the faceplate. Rather than remove a section of sheetrock to reposition the electrical box, it was common field practice for the electrician to install the faceplate with longer screws to hide this code violation. This shortcut could allow wires to come into contact with potentially combustible material.

Previously if the electrical box were attached too far forward in the wall cavity, the faceplate would not be flush with the wall surface. While this was not as dangerous as the previous example, it was visually unappealing for the end user. Rather than remove a section of sheetrock to reposition the electrical box, it was common field practice for the electrician to deform the box, forcing it deeper into the wall cavity. This action would further compromise the security of the electrical box and could damage the wire and components housed within the electrical box.

Previously additional time was spent aligning the switches within an electrical box to accommodate the proper fit of the faceplate. Electrical connections were often compromised as the switches were shoved and twisted within the electrical box while seeking this proper alignment.

Previously additional time was spent installing the screws to secure the faceplate. A quad-switch electrical box would typically require eight small screws to secure it into position, requiring the cost of the screws and the cost of the electrician's time to align the switches and screw in the screws.

Previously the power would need to be turned off prior to any future switch replacement. Time was required to isolate the appropriate circuit at the circuit breaker panel. An error could result in physical harm.

This electrical field is full of different devices, and there is a need to simplify methodology and equipment. Over the years many devices have attempted to simplify the wiring of electrical boxes, including U.S. Pat. No. 5,525,754 to Akins; U.S. Pat. No. 5,471,012 to Opel; U.S. Pat. No. 4,336,418 to Hoag; and many others. However, these prior art devices are typically application specific and can actually make the installers job more complex and, at times, more confusing. The electrical boxes from all of these patents have, among other things, multiple internal parts comprising sandwiched bus bar or bus plate assemblies with insulating spacers, thus requiring an increased cost and significant manufacturing and assembly requirements. While some of these parts and pieces may be utilized in certain aspects of the present invention, none of the prior art teaches the simple and effective aspects of the present invention. By way of non-limiting example, they only support a limited number of electrical devices specifically designed to fit their unique electrical box, and/or exclude many other devices currently under production by manufacturers around the world.

BRIEF SUMMARY OF THE INVENTION

Accordingly, several objects and advantages of the present invention include the design and establishment of methods and/or apparatuses that can set an industry standardization base line for connections to an electrical distribution system. This level of stylization will allow all manufacturers to continue to produce their current line of electrical devices, yet enjoy the advantages of modular connectivity of their product line into a universal electrical box. It is an advantage of embodiments of this invention that modular connectivity will provide a tremendous benefit to the industry with respect to labor cost savings, safety, speed, and accuracy. While this invention is broad, one only has to think back to the popularity of the fuse box prior to the introduction of the circuit breaker and its associated panel. The circuit breaker revolutionized the electrical industry by bring a level of standardization, safety, and modular connectivity to an entire industry.

It is another object of the present invention to reduce the skill, experience, and knowledge required to proficiently and safely wire the multitude of electrical devices in an average home. An advantage is the simplicity of 'Plug-and-Play' operability. In aspects of the invention, the devices are 'hot-swappable' and a homeowner can even safely and quickly change a light toggle switch to a dimmer switch without even turning the power off. Even a novice can install a three-way switch by simply acquiring two three-way switches.

It is yet another object of the present invention to establish an industry wide connection standardization methodology. Every manufacturer will be able to design their devices relying on a standardized connection methodology. This methodology defines the specific size and shape of the rear housing for their device and the location of each electrical connection brush or clip as required by the universal electrical box aspect of this invention.

It is yet another object of the invention to provide different phases of participation by the industry. Phase one can be a transitional phase which can include a universal mounting apparatus or adaptor that can be easily attached to almost all of the electrical devices on the market today. Phase two of the transition may require manufacturers to modify their product line. While this is explained later in detail, this modification is generally very minor in nature and does not change or alter many if any of the primary interior parts or functionality of their specific device. It only potentially requires a repositioning and modification of the connection points on their current devices to meet the new standardization or apparatus.

It is yet another object of the present invention to decrease the probability of wiring errors in the field. It is an advantage that an electrical box of the present invention can provide a series of connection contact points, consistently at the same location, within every electrical box. With knowledge of the specific coordinates of each wire's connection point, every manufacture can make minor modifications to their products connection points to take advantage of these embodiments of the invention. The installer in the field can simply select the appropriate device, switch, receptacle, etc. and slide it into the electrical box to make the correct connections, totally eliminating the need to hand-wire every device. If certain manufacturers do not wish to participate, then the installer has the option to use a universal mounting apparatus or adaptor, or they can simply wire a noncompliant device in a traditional fashion. No products are excluded.

It is still another object of the present invention that safety will be enhanced using the modular plug-and-play standardization embodiments of this invention, which can eliminate field hand-wiring operations of the participating electrical devices. It is an advantage of embodiments of the present invention that electrical devices such as receptacles, switches, dimmers and the like can be wired more efficiently, often robotically, at the factory. If their connection points are modified to meet the standardization requirements set by embodiments of this invention, any electrical device can participate in this invention.

It is still another object of the present invention to eliminate the time needed for hand-wired connections. It is an advantage of embodiments of the present invention that valuable time will be saved when wires do not need to be prepped, sorted, twisted, capped, screwed, or otherwise individually connected, one at a time, by the electrician in the field. Ground connections can be made automatically. Neutral connections can be made when appropriate. Power feed, commons, travelers, and circuit continuity can all become a function of switch design using the universal mounting apparatus of embodiments of the present invention. When wiring requirements are made within the device itself, then field wiring errors are generally eliminated.

It is still another object of the present invention to save resources by reducing the amount of wire required to be pulled to each electrical box. Extra wire, currently required to allow for connections, will generally not be required. This can amount to a substantial savings in material that is typically discarded as connections are made.

It is still another object of the present invention to eliminate the cost of twist-on wire connectors within an electrical box. It is an advantage of embodiments of the present invention that a substantial savings of time and resources will be achieved when wires do not need to be capped, screwed, or otherwise individually connected, one at a time, by the electrician in the field. The size of the electrical box can then be standardized with the elimination of the space required by code for the twist-on wire connectors and twisted wires, thus minimizing inventory requirements of different depth electrical boxes and different size twist-on wire connectors.

It is still another object of the present invention that the labor time required to make all the connections, one at a time within each box, will be reduced to just the time required to slide in the correct device and secure it in place. Wires may still need to be stripped, but they will not have to be twisted, capped, or otherwise connected to other wires or switches associated with that box prior to inserting that device and securing it.

It is still another object of the present invention to increase safety, because connections will not be compromised because the wires will not have to be twisted, turned, and compressed into the back of their electrical box. It is an advantage of embodiments of the present invention that wires will be isolated from one another to prevent the possibility of a short within the electrical box, thus enhancing safety and eliminating the need for call back repairs.

It is still another object of the present invention to provide view ports to allow electrical inspectors to quickly visually inspect each and every electrical box with a hands-off single glance. It is an advantage of embodiments of the present invention that when the wire's insulation colors match the reference dots adjacent to their respective view ports, the box is wired correctly and thus any device ever plugged into the box will be wired correctly. Electrical inspectors will no longer have to rely on random sampling during on-site job inspections. Even an amateur can easily inspect every electrical box for correct wiring.

It is still another object of the present invention that the time required to clean the interior of the electrical boxes and each wire contained within would be eliminated. An advantage of embodiments of the present invention offers a method to protect all of the wires within the electrical box so they will not become contaminated by sheetrock material, dust, sprayed on wall texture, paint, and other construction debris.

It is still another object of the present invention that once the sheetrock is in place, the electrician would not be required to visually sort and identify which wires lead to which location. It is an advantage of embodiments of this invention to complete this step prior to sheetrocking.

It is still another object of the present invention to eliminate the pragmatic connection problems associated with dissimilar wire types when making connections. It is an advantage of embodiments of the present invention that electricians of all skill levels would not have to address the inconvenience of connecting devices with stranded wire leads to solid stiff wire leads.

It is still another object of the present invention to provide a novel method of securing the electrical box to its respective supporting stud. It is an advantage of embodiments of the present invention that the electrical box can snap-on to its supporting stud without the use of hand tools. It is yet another advantage to ensure a stable and secure attachment in the horizontal plane perpendicular to the supporting stud under harsh field conditions. It is yet another advantage to allow the electrical box to freely move forward and aft within the wall cavity throughout the construction process thus minimizing damage during the sheetrock installation process. It is yet another advantage to allow the electrical box to self-adjust to the final wall depth ensuring code compliance and a flush and proper faceplate fit with respect to the wall surface.

It is still another object of the present invention to eliminate the time required to align the wires and the switches within an electrical box to accommodate the proper fit of the faceplate. Since the present invention does not require connections to be stuffed behind the switches and since the switches are seated into a well defined location within the electrical box the proper fit of the faceplate is assured without special consideration, saving considerable time and resources.

It is still another object of the present invention that safety is greatly enhanced because all connection points are recessed and isolated deep within the electrical box. The modular devices assure that correct connections are made without regard to the training or skill level of the installer.

Another object and advantage of this invention is its ability to minimize installer mistakes while reducing workload requirements. Embodiments of this invention will save installer time while improving connection accuracy, and will introduce an industry standardization protocol while, at the same time reducing training requirements. This invention will also reduce a required inspection step while simplifying the inspection process at each electrical box. Further objects and advantages will become apparent from a consideration of the ensuing description and drawings.

In accordance with one embodiment of the present invention a power distribution system is disclosed, comprising a junction box, with one or more individual receiving bays, capable of providing a series of standardized termination points. The standardized termination points allow modular connectivity and plug-and-play termination of a multitude of devices used in electrical power control and relay. In addition, a method of standardization is provided that is industry compatible and capable of establishing a baseline for electrical connections for electrical distribution devices industry wide. Advantageously, the various embodiments of the disclosed power distribution system can be installed more quickly and easily thereby reducing costs of construction and reducing the possibility of miswiring the circuit.

In one embodiment, an electrical apparatus comprises a junction box having a rear wall, a top wall, a bottom wall, a left side wall, a right side wall, and a front face, wherein at least a portion of the front face is open to expose a cavity bounded at least in part by the walls. The apparatus has a housing or channel that can contain a portion of an entry wire (such as one from a power breaker) within the junction box, and the housing has an aperture at a set location to expose a non-insulated portion of the entry wire to the cavity so that the junction box can receive a modular connection unit such that upon the box receiving the unit a conductive connection is automatically made between the exposed non-insulated portion of the entry wire and the connection unit.

In one embodiment, an electrical apparatus comprises a junction box having a rear wall, a top wall, a bottom wall, a left side wall, a right side wall, and a front face, wherein at least a portion of the front face is open to expose a cavity bounded at least in part by the walls. The apparatus has a housing or channel to contain a portion of an entry wire within the junction box, and the housing has an aperture in a fixed and standardized location to expose a non-insulated portion of the entry wire to the cavity so that the junction box can receive a modular connection unit having a conductive connector in a fixed and standardized location thereon such that, upon the box receiving the connection unit, the conductive connector automatically passes into the aperture and automatically electrically connects to the exposed non-insulated portion of the entry wire.

In another embodiment, the invention relates to a method of wiring an electrical device to a power source, comprising the steps of providing a junction box, leading a wire into a cable channel into the box such that a non-insulated portion of the wire is oriented in a set location and orientation within the box, providing a modular cowling adapted to matingly fit within the box in a set orientation, the cowling having a conductive element disposed thereon at a set location and orientation corresponding to the location and orientation of the non-insulated portion of the wire, and positioning the cowling within the box to automatically conductively connect the conductive element with at least a portion of the non-insulated portion of the wire.

In another embodiment, the invention relates to a wall plate adapted to overlay an electrical device and configured to fixedly engage a junction box that houses the electrical devices without the use of screws or a sub-plate.

In another embodiment, the invention relates to a mounting bracket for mounting an electrical junction box, comprising a front face and a first side face and a second side face connected to the front face, each side face forming an approximately 90 degree angle with the front face, wherein at least the first side face comprises a means for securing the bracket to a wall stud and wherein the first side face comprises on its exterior face a means for slidably mounting a junction box.

In some embodiments, the means for mounting includes a rail configured to slidably engage a flange on the junction box. In other embodiments, the mounting bracket has a front detent and a rear detent on the bracket configured to bound the slidable movement of the junction box. In another embodiment, the means for securing includes integral angled nail sets configured to engage a wall stud to prevent removal of the bracket. The second face may be a blade edge and any of the faces may have material cutouts.

In another embodiment, the invention relates to an electrical device assembly comprising an A/B switch device connected to a cowling connected to the switch device and the assembly has a manually activatable external switch that can switch the electrical device assembly's internal electrical pathways from a first configuration to a second configuration.

In another embodiment, the invention relates to an electrical device assembly having an electrical device configured to be at least partially mounted in a wall, electrical conductors inside the device including at least one traveler conductor capable of serving as a traveler wire, a first electrical path inside the device that does not include the traveler conductor, a second electrical path inside the device that includes the traveler conductor, and a manually activatable external switch on the electrical device assembly adapted to select between the first electrical path and the second electrical path.

In some embodiments, the electrical device is configured to connect to a junction box in a wall and to receive a wire from a power source, and in other embodiments the electrical device assembly can receive a wire from an electrical fixture and a wire from a second electrical device assembly electrically connected to the electrical fixture, such that the electrical devices can independently control the electrical fixture.

In another embodiment, the invention comprises a method for wiring a multi-way electrical connection, comprising the steps of: providing a first and second electrical devices configured to be at least partially mounted in a wall; providing electrical conductors inside the first and second devices including at least one traveler conductor capable of serving as a traveler wire; providing a first electrical path inside the first and second devices that does not include the traveler conductor and a second electrical path inside the first and second devices that includes the traveler conductor; providing a manually activatable external switch on the first and second devices adapted to select between the first electrical path and the second electrical path; electrically connecting at least one first wire from the first device to an electrical fixture and from the electrical fixture to the second device; electrically connecting at least second wire from the first device to the second device without electrically connecting the second wire to the electrical fixture; electing the manually activatable external switch on the first device to a first position corresponding to the first electrical path; and selecting the manually activatable external switch on the second device to a second position corresponding to the second electrical path.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In the drawings, closely related figures have the same number but different alphabetic suffixes. For a more complete understanding of the present invention, reference is now made to the following descriptions taken in conjunction with the accompanying drawings, in which:

FIG. 2 is a front perspective elevation of the main body of a single bay junction box embodiment of the present invention.

FIG. 3 is a bottom left perspective elevation of the main body of a single bay junction box embodiment of the present invention.

FIG. 4 is an upper right rear perspective elevation of the main body of a single bay junction box embodiment of the present invention.

FIG. 5 is a forward upper right perspective elevation of the main body of a single bay junction box embodiment of the present invention.

FIG. 7-R1 is a front view of a single bay junction box assembly mounted on the right side of a supporting stud according to an embodiment of the present invention.

FIG. 7-R2 is a front view of a two bay or double junction box assembly mounted on the right side of a supporting stud according to an embodiment of the present invention.

FIG. 7-R3 is a front view of a three bay or triple junction box assembly mounted on the right side of a supporting stud according to an embodiment of the present invention.

FIG. 7-R4 is a front view of a four bay or quadruple junction box assembly mounted on the right side of a supporting stud according to an embodiment of the present invention.

FIG. 7-L1 is a front view of a single bay junction box assembly mounted on the left side of a supporting stud according to an embodiment of the present invention.

FIG. 7-L2 is a front view of a two bay or double junction box assembly mounted on the left side of a supporting stud according to an embodiment of the present invention.

FIG. 7-L3 is a front view of a three bay or triple junction box assembly mounted on the left side of a supporting stud according to an embodiment of the present invention.

FIG. 7-L4 is a front view of a four bay or quadruple junction box assembly mounted on the left side of a supporting stud according to an embodiment of the present invention.

FIG. 8 is a front perspective view of a two bay junction box according to an embodiment of the present invention.

FIG. 9 is a bottom perspective view of a two bay junction box according to an embodiment of the present invention.

FIG. 10 is a left perspective view a two bay junction box according to an embodiment of the present invention.

FIG. 11 is a upper right rear perspective view a two bay junction box according to an embodiment of the present invention.

FIG. 22-SP is a rear perspective view of the cowling and clips for a single pole device according to an embodiment of the present invention.

FIG. 22-DP is a rear perspective view of the cowling and clips for a double pole device, a single pole changeover or single pole change off device, a four-way switch, and the like according to an embodiment of the present invention.

FIG. 22-A/B is a rear perspective view of the cowling and clips for a multi-purpose A/B switching device according to an embodiment of the present invention.

FIG. 23-B is an exploded view of a switch from the left rear perspective according to an embodiment of the present invention.

DRAWINGS

Figure 1:
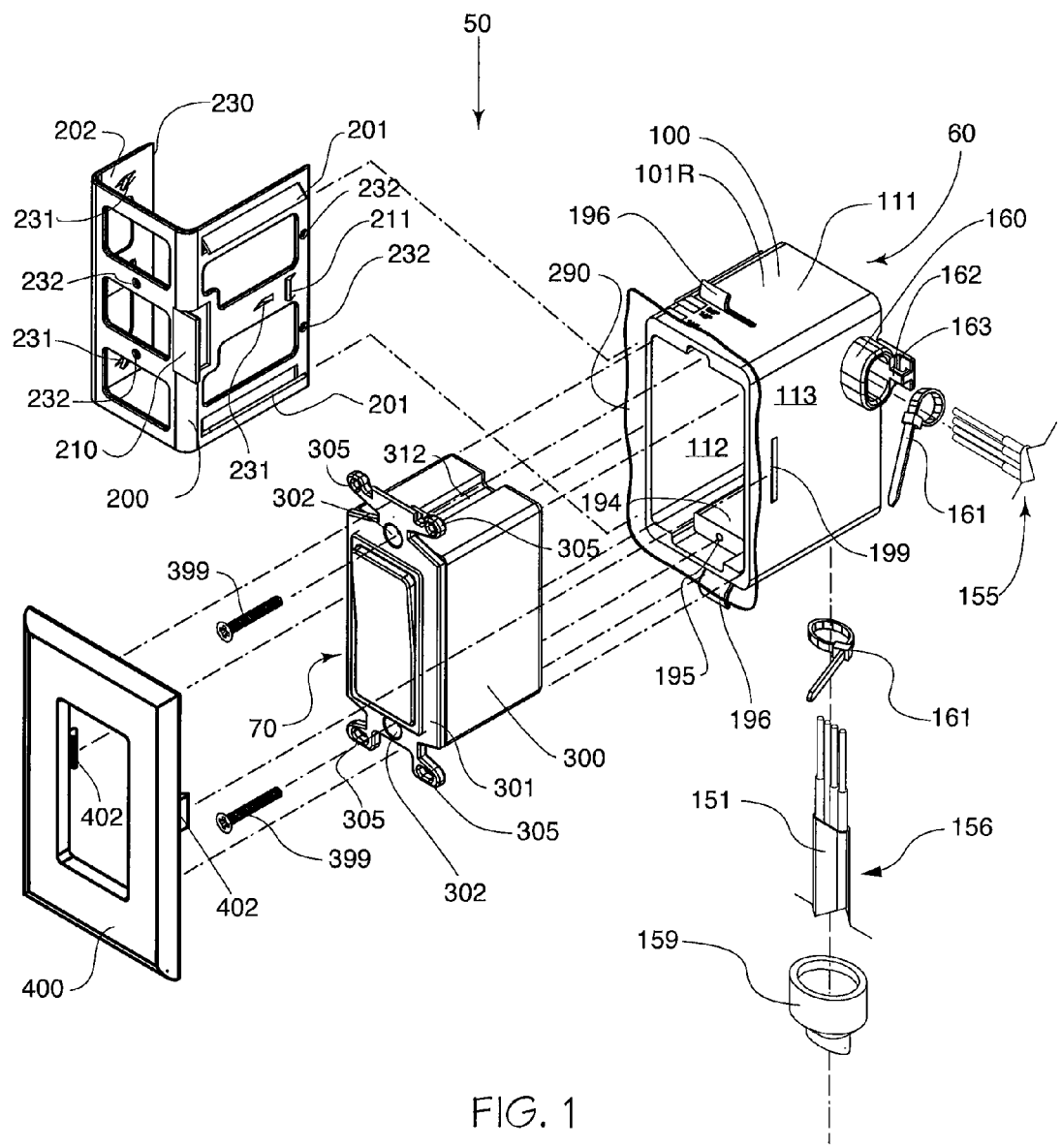
FIG. 1 is an exploded view of a power distribution system embodiment of the present invention.

Reference Numerals power distribution system 50
junction box assembly 60
electrical device assembly 70
electrical junction box 100
hub 109
rear wall 110
top wall 111
mounting flange sidewall 112
power port sidewall 113
power port bottom wall 114
interior wall 115
channel 120
channel entry point 121
insulation channel section 122
bare wire channel section 123
contact port 125
contact port group 126
view port 130
color dot group 140
electrical wire 150
cable jacket 151
input power cable 155
control or relay power cable 156
nipple 159
cable entry shield 160
nylon cable tie 161
tie down ring 162
curved guide path 163
channel group 181
wall depth gauge 188
key slot 189
bus bar 190
support ramp 191
beveled walls 192
stabilization walls 193
stability alignment spine 194
threaded hole 195
flex tab 196
mounting flange 197
strip gauge 198
notch 199
mounting bracket 200
mounting bracket rails 201
blade leg 202
forward stop 210
aft stop 211
blade edge 230
nail sets 231
screw holes 232
clear cover 290
Supporting Stud 299
electrical device 300
electrical device mounting strap 301
electrical device strap holes 302
mounting strap ears 305
cowling 310
stability alignment groove 312
stability alignment key 313
aperture 314
universal cowling 315
universal cowling attachment wires 316
UC adaptor plate 317
break-away guides 318
securing tabs 319
terminal connection device 320
brush 321
clamp 322
clip 323
A/B switch 325
electrical connection internal bus bars 330
receptacle 350
stability alignment groove 394
gasket 398
securing devices 399
face plate 400
strap catch 401
securing clip 402
hinge tab 403
wallboard exterior surface 410
wallboard interior surface 411
electrical junction box—left 101L
electrical junction box—right 101R
double box—left 102L
double box—right 102R
black dot 140B green dot 140G
red dot 140R
white dot 140W
hot-black electrical wire 150B
green or ground electrical wire 150G
hot-red electrical wire 150R
white or neutral electrical wire 150W
horizontal channel group 181H
vertical channel group 181V
left mounting bracket 200L
right mounting bracket 200R
A/B connection interface 340AB
DP connection interface 340DP
SP connection interface 340SP

DETAILED DESCRIPTION OF THE INVENTION

As used herein, the use of the word "a" or "an" when used in conjunction with the term "comprising" (or the synonymous "having") in the claims and/or the specification may mean "one," but it is also consistent with the meaning of "one or more," "at least one," and "one or more than one." In addition, as used herein, the phrase "connected to" and the like means joined to or placed into communication with, either directly or through intermediate components.

In one embodiment, this invention introduces a new industry standard connection protocol. While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

In one embodiment, this invention defines a standardized connection methodology that minimizes field wiring requirements while providing accurate, safe, reliable terminal connections between the vast majority of electrical devices currently on the market and the wire and cabling commonly used throughout the industry.

Referring now to the drawings wherein the showings are for purposes of illustrating preferred embodiments of the present invention only, and not for purposes of limiting the same, the following hardware devices may be used in the context of certain embodiments of the invention. Further objects and advantages will become apparent from a consideration of the ensuing description and drawings.

It is important to note that industry standard electrical wiring, as well as the distance between the center points of the securing devices, are two generally standardized features used throughout the electrical industry. In some embodiments, this invention incorporates these two industry standards.

FIG. 1 illustrates one embodiment of a power distribution system 50. As shown, the power distribution system 50 comprises junction box assembly 60, electrical device assembly 70, and optionally, securing device 399 and wall plate 400.

Junction Box Assembly and Overview

The junction box assembly 60 comprises junction box 100 and in the embodiment in FIG. 1 is referred to as a junction box 101R, which can receive a single (one) electrical device assembly 70 and can mount on the right side of the supporting wall stud. Junction box 100 can mount to a stud or other securing wall, including for example sheet rock, by any means known in the art, including fastening devices, adhesives, hook and loop, etc. In some embodiments, mounting bracket 200, described more fully below, can connect to the side of junction box 100 and can attach the power distribution system 50 to a wall stud 299 (see FIG. 36). Junction box 100 is adapted to receive components such as electrical device assembly 70, which comprises cowling 310, electrical device 300, and one or more terminal connection devices 320 (see FIG. 19).

In some embodiments, during the rough-in stage of construction, electrical power is provided to the power distribution system 50 from a conventional service panel, circuit breaker panel, or the like (not shown). An input power cable 155, such as industry standard type cabling of solid or stranded conductors or wires of known technology, is utilized to connect the circuit breaker panel to junction box 101R. Electrical power, controlled or relayed through electrical device 300, is then conveyed from junction box 101R to items such as lights, fans, and receptacles of known technology (not shown), by control or relay power cable 156, for example industry standard type cabling comprised of solid or stranded conductors, or wires known technology.

In some embodiments, during the trim-out stage of construction, after the wall surface is installed, electrical device 300 is inserted into junction box 100 and can optionally be secured with securing devices 399. A face plate, trim plate, or wall plate 400 can then be attached. In the preferred embodiment, the wall plate 400 snaps or slidably engages. However, in other embodiments, the size and scale of the electrical device assembly 70 can allow the use of all standard size wall plates 400 to attach by conventional means.

FIG. 2 illustrates one embodiment of junction box 100 in which it is a single piece of rigid, non-conductive material that is shaped by an injection molding process. The body of each junction box 100 incorporates at least one cavity, receiving slot, or a bay 109 that is open to the front of the box. The bay 109 is collectively defined by a plurality of walls comprising, in some embodiments, a rear wall 110, a top wall 111, a mounting flange sidewall 112, a power port sidewall 113, and a power port bottom wall 114.

FIG. 3 shows an embodiment of the mounting flange sidewall 112 with a mounting flange 197 as a molded part of the mounting flange sidewall 112. The power port bottom wall 114 can also be seen with optional cable entry shield 160. A spine 194 optionally used for stability alignment of the electrical device assembly 70 can be seen on the interior side of the top wall 111.

FIG. 4 illustrates an embodiment of the power port sidewall 113 with the optional cable entry shield 160. A group of four channel entry points 121 can be seen inside the cable entry shield 160. An optional notch 199 that will receive an optional securing clip 402 from wall plate 400 can be seen on the power port sidewall 113. Optional strip gauges 198 can be seen, both vertically and horizontally oriented, on the rear wall 110.

Figure 6:
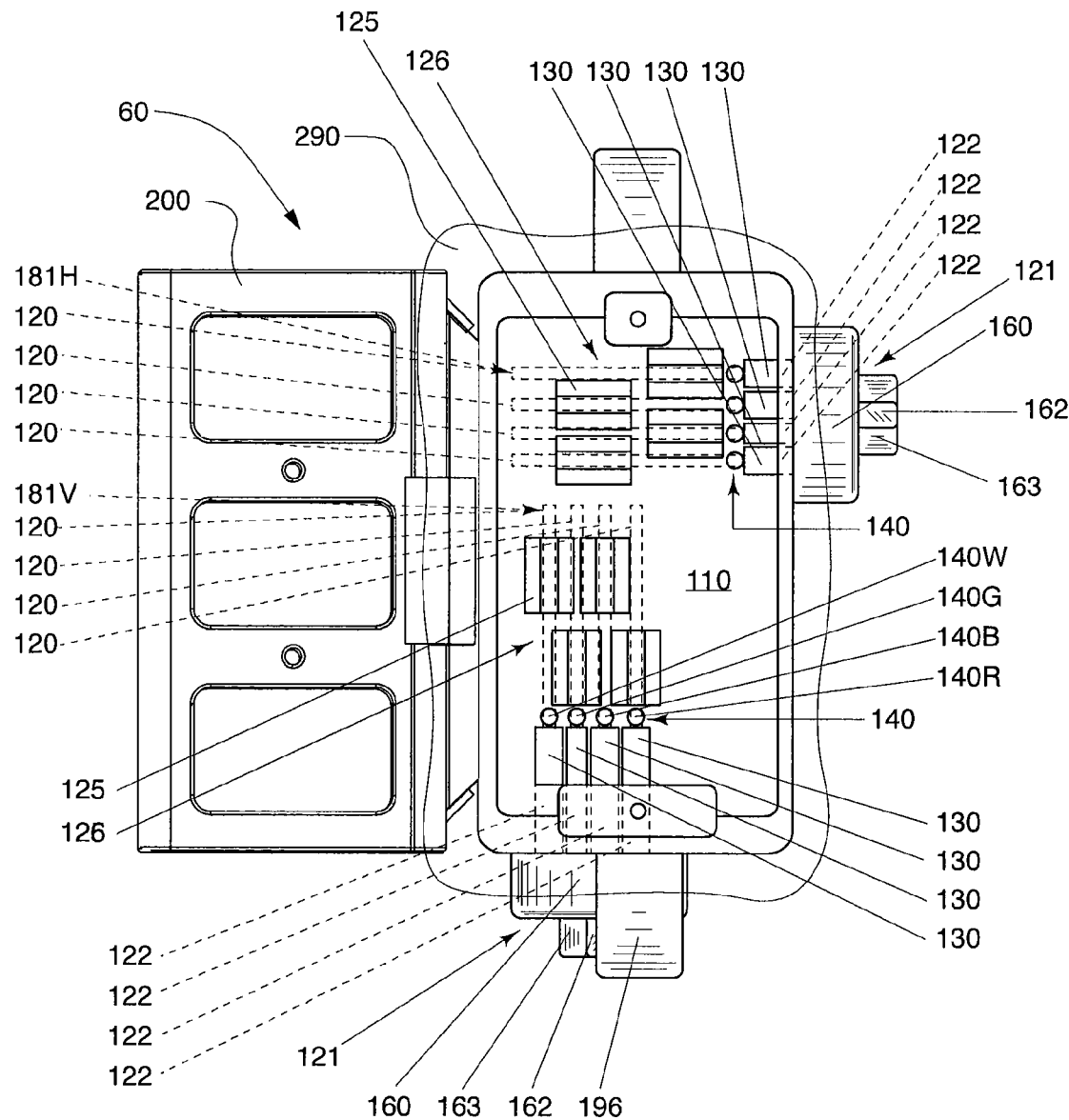
FIG. 6 is a front view of a junction box assembly with hidden line presentation of internal channels according to an embodiment of the present invention.

FIG. 5 depicts an embodiment of bay 109 with optional lower stability alignment spine 194 and key slot 189 to provide additional stabilization to the electrical device assembly 70 when installed. FIG. 6 shows an embodiment of the front view of a junction box assembly 60, comprising junction box 100 with mounting bracket 200 and clear cover 290 constructed in accordance with the teachings of the present invention.

Channels

Each junction box 100 can incorporate a series of hollow straight distribution passages, tubes, or channels 120, which house, stabilize, and/or position a conductor or wire 150 that will serve like a bus bar within the junction box 100. Channels 120 will also keep wire 150 electrically isolated from other conductors, including wires 150 in other channels 120.

In one embodiment, an individual channel 120 is round and embedded within the non-conductive material comprising rear wall 110 of a junction box 100. As shown in FIG. 4, each channel 120 has a channel entry point 121 where the channel end is open through power port sidewall 113, facilitating future insertion of wire 150. A group of channel entry points 121 can be located within the confines of cable entry shield 160 on both the power port sidewall 113, and the power port bottom wall 114 on each junction box 100. Channels 120 may have other shapes and orientations, and can begin at different walls. In addition, each cable channel 120 need not be a single continuous passageway, but may be other housings such as a series of rings or other retaining structures to properly orient the wire.

Figure 12:
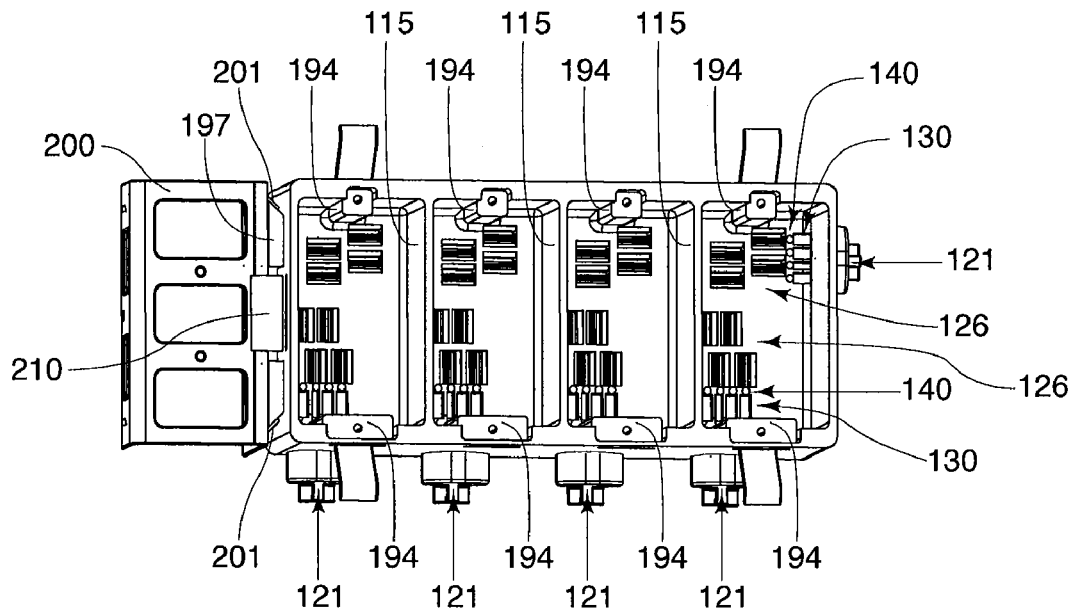
FIG. 12 is a frontal perspective view of a four bay junction box assembly according to an embodiment of the present invention.

In some embodiments, channel entry point 121 opening of each channel 120 is through power port sidewall 113 and/or power port bottom wall 114. If the channel entry point 121 is accessed through the power port sidewall 113, then the channel 120 will be referred to as a horizontal channel 120 and will extend through each bay 109 of the junction box 100, as shown in FIG. 8 and FIG. 12, but it will generally not penetrate the opposite mounting flange sidewall 112. This horizontal extension through multiple bays provides a quick and easy way to electrically connect multiple bays. If channel entry point 121 is through the power port bottom wall 114, as shown in FIG. 9, then the channel will be referred to as a vertical channel 120 and will preferably terminate prior to intercepting a horizontal channel 120. Channels 120 can allow for other insertion methods, such as removing portions of junction box 100 or walls and laying wires into the channels.

Figure 13:
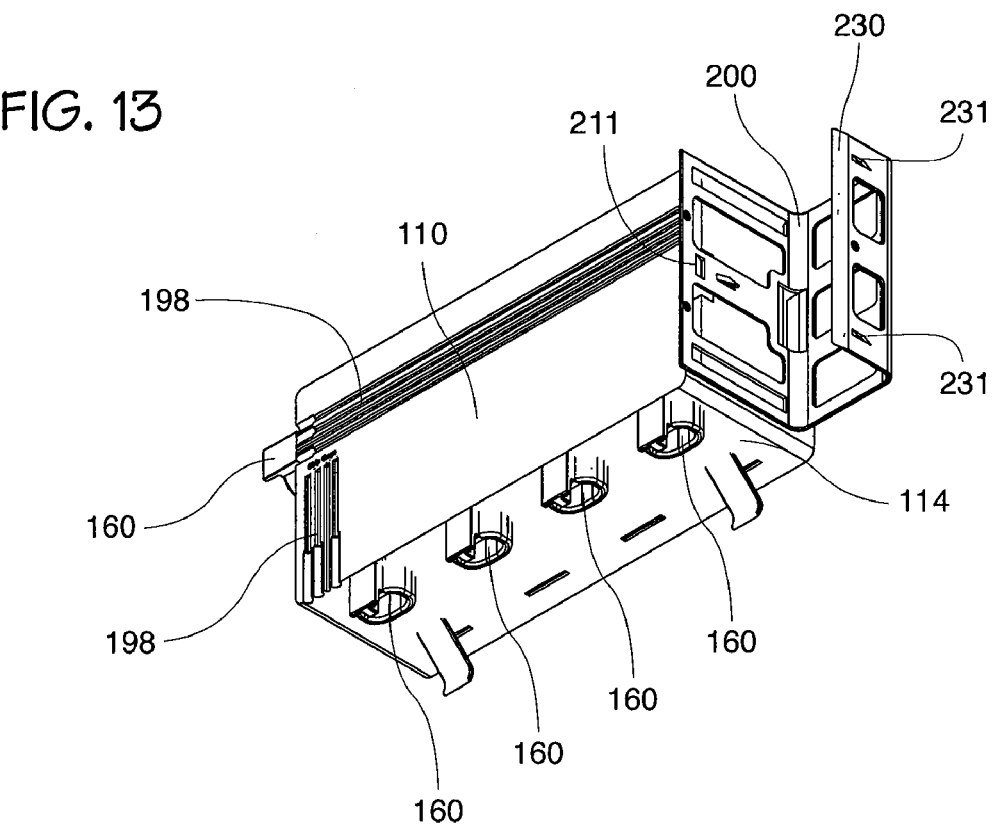
FIG. 13 is a lower rear perspective view of a four bay junction box assembly according to an embodiment of the present invention.
Figure 14:
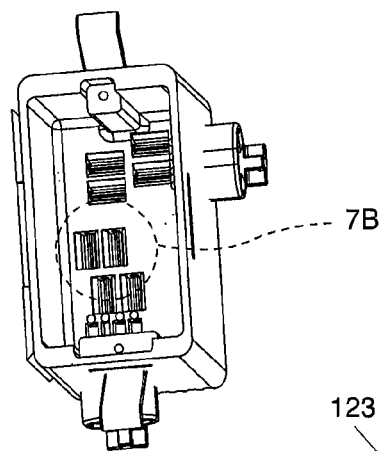
FIG. 14 is a front view of a junction box according to an embodiment of the present invention.

In some embodiments, each channel 120 comprises at least two sections, insulation channel section 122 and bare wire channel section 123, with each having a different bore diameter. Insulation channel section 122 and bare wire channel section 123 preferably share a common centerline forming one continuous lumen or conduit channel 120. Optionally, strip gauges 198, both horizontal and a vertical, are embossed in an exterior wall, such as rear wall 110, and represent the target length of wire 150 to be striped prior to insertion into channels 120 of junction box 100, as shown in FIGS. 11 and 13. In other embodiments, channels 120 do not have a bare wire portion.

Referring to the embodiment in FIGS. 9 and 10, channel entry points 121 lead to insulation channel sections 122 in power port sidewall 113 or the power port bottom wall 114. Referring also to FIG. 6, the insulation channel section 122 preferably has a larger bore diameter than the bare wire channel section 123 and extends from the channel entry point 121 into the first bay 109 of the junction box 100R and then far enough to allow for a view port 130.

View Ports

View port 130, as shown in the embodiments of FIGS. 2 and 6, is an opening, void, or inspection hole or window preferably extending from a bay wall to the a portion of at least one channel 120 that allows a viewer to see a portion of the wire with insulation thereon to determine what wire is in what channel. In some embodiments, one view port can serve multiple channels. For embodiments with multiple bays, view ports 130 are located in the first bay 109, adjacent to the channel entry point 121 for each horizontal channel and in each bay 109 for each vertical channel 120. Preferably, the bore diameter of the insulation channel section 122 will allow insertion of the largest wire 150 planed for use in the junction box 100 with the wire's insulation included and surrounding the wire. Once inserted, the insulation covering the wire 150 is visible through view port 130, and thus viewable, for example, when an observer is in front of and looking into the junction box 100.

Color Code Reference

A color marking, a color spot, or color dot can be displayed on nearby surfaces such as a surface of bay 109, preferably adjacent to each view port 130, representing the correct color-coding for the wire 150 to be inserted into that particular channel 120. A color dot group 140 can consist of one, two, three, four or more color dots representing or relating to the industry standard color markings. Generally, in the United States a red dot 140R represents hot red wires, a black dot 140B represents hot black wires, a green dot 140G is used for ground wires, and a white dot 140W for neutral white wires. A color dot group need not use all four colors, and in some cases only one or two will be needed. In some embodiments, identifiers other than color can be used, such as shapes, letters, or the like. In some embodiments, the view port 130 will facilitate visual confirmation, by comparison, that the appropriate wire 150 has been properly inserted into the correct channel 120.

Channel Steps

In one embodiment, the bore of channel 120 is stepped down or reduced from the insulation channel section 122 bore size to a size only slightly larger than the diameter of the largest bare wire planed for use in the junction box 100 (for example, AWG #10 or AWG #12). The bare wire channel section 123 of the channel 120 starts at the end of the insulation channel section 122 and generally extends for the remainder of the channel 120. The reduced bore size allows the bare wire 150 to pass freely while restricting wire portion with insulation still attached to the insulation channel section 122.

Channel Groups

A plurality or series of channels 120 comprise a channel group 181. In the preferred embodiment, the channel group 181 is comprised of four separate channels 120. Each channel 120 in the channel group 181 can be referred to by its respective industry standard color code of, for example, red, black, green, or white.

While various orientations are possible, in one embodiment, all channels 120 in a channel group 181 are equidistant apart, parallel to each other, and oriented parallel to the rear surface of the rear wall 110. Each bay 109 can have a horizontal channel group 181H and a vertical channel group 181V. In one embodiment, every junction box 100 will have at least one horizontal channel group 181H, which will preferably extend across to all bays 109 within multi-bay junction boxes 100. Likewise, each bay 109 can have at least one vertical channel group 181V of channels 120. Thus, in one embodiment, a quad box 104 will have four vertical channel groups 181V.

Contact Ports

Referring to the embodiments in FIGS. 2, 5, 14, and 15, each bay 109 can have a void, opening, cavity, or port from bay 109 through part of the non-conductive material forming the junction box 100 to expose or connect the lumen of each channel 120. This cavity forms an opening or a contact port 125 that extends from the bay 109 opening to a point that allows exposure of the lumen of channel 120 on the interior face of rear wall 110. In one embodiment, the port 125 does not extend through the exterior of rear wall 110 of junction box 100, thus insulating the channels from anything outside of junction box 100. Contact port 125 can be configured to expose either an insulated or a non-insulated portion of a wire in channel 120.

In one embodiment, contact port 125 is of sufficient size to accommodate a terminal connection device 320 (as will be described in greater detail below) without compromising electrical isolation of neighboring wires 150. Terminal connection devices 320, attached to electrical device 300 (i.e., a switch, duplex plug, dimmer, etc.), will be allowed to make an electrical connection by making contact, directly or indirectly, with the required wires 150 in channels 120, through the contact ports 125. Each contact port 125 is preferably centered over its respective channel 120.

Figure 15:
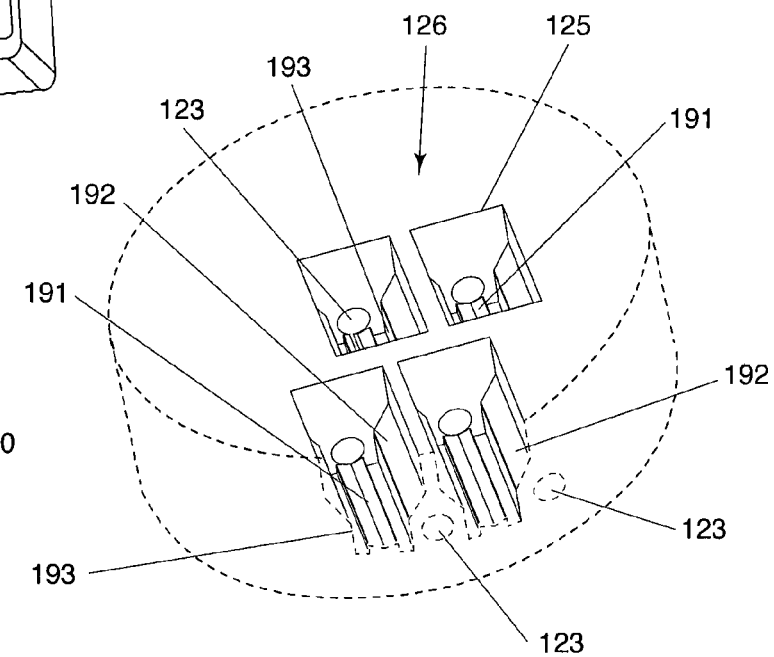
FIG. 15 is a section taken from FIG. 14 to show the contact ports and channel separation according to an embodiment of the present invention.
Figure 16:
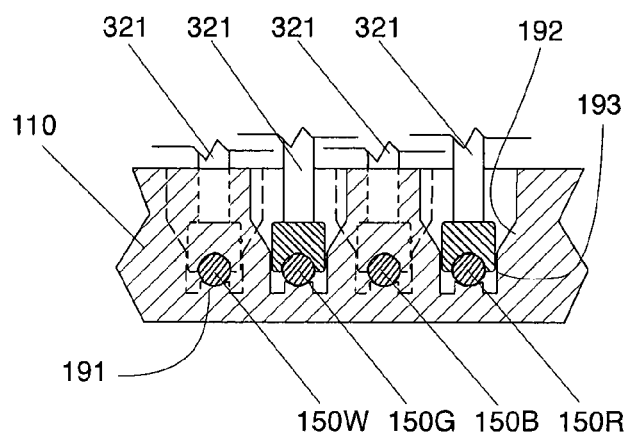
FIG. 16 is a sectional view of a contact port group showing brush contacts engaging wires within their contact ports according to an embodiment of the present invention.
Figure 17:
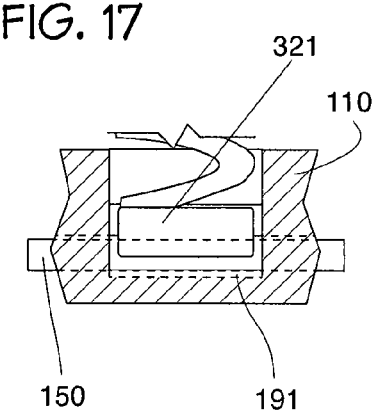
FIG. 17 is a sectional side view of a contact port showing a brush contact engaging a wire within the contact port according to an embodiment of the present invention.

As shown in FIGS. 15 and 16, in one embodiment, bridge or support ramp 191 supports wire 150 against the pressure load applied by a brush, clamp, clip, or other type of connection device 320 when assembled. A series of opposed beveled walls 192 can form the opening of contact port 125 and assist in funneling and centering the alignment of connection device 320 over wire 150 or connection thereto. An optional series of opposed stabilization walls 193 at the base of contact port 125 restrict movement of connection device 320 once seated on wire 150 or connection thereto.

The specific location coordinates of each contact port 125 within bay 109 is preferably methodically assigned for standardization, although the particular orientation for the standard can be somewhat arbitrary. The location of contact ports 125 for a channel group 181 can be further defined by the industry standard color code markings.

In one embodiment, there are four contact ports 125, one for each channel 120 comprising the horizontal channel group 181H. In the embodiment shown in FIG. 2, the contact port 125 for red channel 120 is located in the upper right corner, the contact port 125 of black channel 120 is down to the left, the contact port 125 of the green, or ground, channel 120 down and in direct alignment below red channel 120 contact port 125, and the contact port 125 of white channel 120 is located in alignment directly below black channel 120 contact port 125. The area encompassing a specific group of contact ports 125, for example, the four relating to the horizontal channel group 181H can be referred to as a contact port group 126.

In one embodiment, the contact port group 126 for vertical channel group 181V is identical to contact port group 126 for horizontal channel group 181H, except it is rotated 90 degrees to the right, and centered over the vertical channel group 181V to be accessed.

As previously mentioned, the inventive design of the junction box 100 allows definition of one or more specific locations for each contact port 125 and contact port group 126, which, if desired, can result in a standardized interface pattern or template. In the preferred embodiment of this invention, each bay 109 utilizes a horizontally oriented contact port group 126 to provide access to wires 150 in the four channels 120 of each horizontal channel group 181H and a vertically oriented contact port group 126 to provide access to the wires 150 in the four channels 120 of each vertical channel group 181V. However, other combination and arrangements are available—for example, the invention is not limited by four channels 120 per channel group 181.

Cable Entry

In an embodiment shown in FIGS. 1, 4, and 5, a cable entry shield 160 surrounds each channel group 181 cluster of channel entry points 121. The cable entry shield, which can be integral to or removably connected to or associated with the junction box 100, preferably extends outwards from junction box 100 forming a protective guide and cover around the incoming cable jacket (not shown) as may be required by code or for safety reasons. When present, cable entry shield 160 can if desired facilitate securing the incoming wire to junction box 100 or other nearby equipment by any number of conventional means.

In the embodiment of FIG. 1, jacket 151 of incoming cable is secured to cable entry shield 160 by a nylon cable tie 161 secured to junction box 100 at tie down ring 162. For simplicity, cable entry shield 160 and tie down ring 162 can be an integral part of the junction box 100 that is formed during the initial injection molding process. Tie down ring 162 can have a curved guide path 163 to assist in threading cable tie 161 through tie down ring. Thus, curved guide path 163 can direct cable tie 161 back towards the installer as it is inserted through ring 162, which is helpful in a confined location. Of course, other methods and devices for securing cables, wires and jackets as are known in the art can be used with this invention.

Clear Cover

In one embodiment, initial installation of all wires 150 are introduced or installed into junction box assembly 60 via channel entry points 121, thus freeing the electrician or installer from needing physical access from the front of the junction box 100. Because the junction box 100 and bay 109 may be exposed to sheet rock, dust, wall texture, paint, and other debris during the construction process, clear cover 290 can be provided over the front face of junction box 109 as shown in FIG. 1. In one embodiment, cover 290 consists of a thin clear plastic membrane attached to the face of junction box 100. Preferably, the installer can see through cover 290 to inspect for proper wiring of junction box 100. Cover 290 can vary in thickness and clearness (e.g., it may be translucent or opaque) and can be made from material other than plastic. Cover 290 can be installed at time of manufacture or later, and can be single use or reusable. Cover 290 can be attached by any known means, including heat seal, adhesive, gripping, snapping, etc. The installer may use cover 290 to write and record notes on, for example for final electrical device assembly 70 requirements. If desired, cover 290 can remain on junction box 100, protecting bay(s) 109 from contamination until the electrical device assembly 70 is installed, at which time clear cover 290 is simply removed and discarded or reused.

Multiple Bay Junction Boxes

FIGS. 7-R1, 7-R2, 7-R3, 7-R4, 7-L1, 7-L2, 7-L3, and 7-L4 illustrate embodiments wherein the body of junction box assembly 60 can be mounted on either the left or right side of a supporting stud 299. In FIG. 7-R1 junction box 100R is a single junction box with power port sidewall 113 located on the right and mounting flange sidewall 112 supporting mounting bracket 200 on the left. In FIG. 7-L1 junction box 101L is a single junction box with power port sidewall 113 located on the left and mounting flange sidewall 112 supporting mounting bracket 200 on the right. Of course, other arrangements are possible, including number of bays, alignment of bays, entry points of wires, mounting method, etc.

Multiple Bays

The maximum number of bays 109 in junction box 100 is preferably limited only by the planned electrical load limit of the circuit feeding junction box 100 and wire load capacity. When more than one bay 109 is desired, the bays 109 are preferably separated by an interior wall 115 as shown in FIGS. 7-R2, 7-R3, 7-R4, 7-L2, 7-L3, and 7-L4. Multi-bay boxes may be made from a unitary structure, or individual bays may be joined by a user after manufacture. In multiple bay 109 junction box assemblies 60 having two, three, and four bays 109, the junction boxes 100 may be referred to as a double box 102L or 102R, a triple box 103L or 103R, and a quad box 104L or 104R, respectively.

Figure 19:
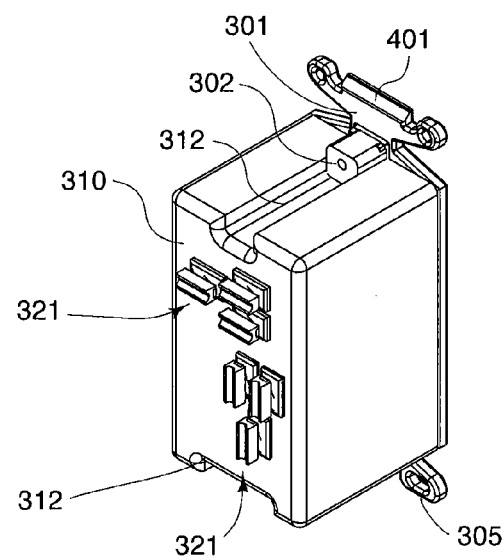
FIG. 19 is a left rear perspective view of a switch with brush contacts according to an embodiment of the present invention.
Figure 21:
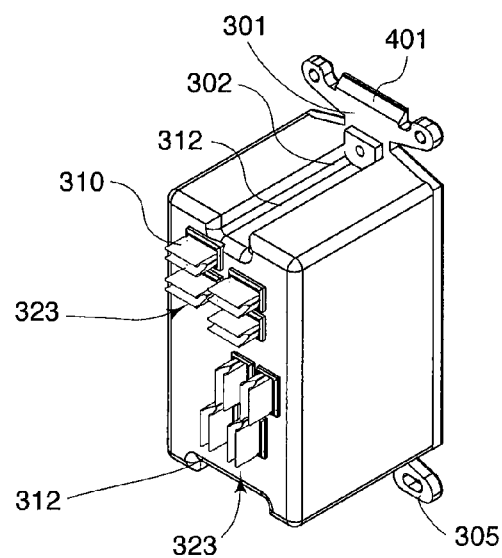
FIG. 21 is a left rear perspective view of a switch with clip contacts according to an embodiment of the present invention.

In the embodiments of FIGS. 8 and 12, all bays 109 are generally identical in size, shape, and lay out. This preferred designed commonality provides a standardized platform that accommodates slidable plug-and-play type connections for a vast majority of switches, receptacles, rheostats, and the like, of current known technology, when housed within a cowling 310, described as part of certain embodiments of this invention in greater detail below. As shown in FIGS. 19 and 21, cowling 310 functions as a compatible transition device between a multitude of terminal connections schemes in use throughout the industry and the preferably standardized terminal connections located in each bay 109.

Alignment Spines

Referring now to FIGS. 3 and 5, in one embodiment, each bay 109 has at least one alignment spine 194, which is molded into the top and/or bottom and/or sides of bay 109 opening. In one embodiment, spines 194 are in the center of top and bottom walls and extend from front to rear in the aft two-thirds of bay 109 opening. Each alignment spine 194 can have hole 195 capable of receiving securing device 399 used to secure the electrical device selectively placed into the bay 109. Hole 195 can be threaded to receive a screw. In one embodiment, the upper alignment spine 194 is of a different size than the lower alignment spine 194 to ensure that components selectively placed in bay 109 are inserted with the proper orientation. When present, spine can have any shape or size, or it can be a groove to fit in a spine of a component to be placed in bay 109.

Mounting Bracket

In some embodiments, referring for example to FIG. 2, mounting flange sidewall 112 provides a means for slidable attachment of mounting bracket 200, described below. A mounting flange 197 extends outward from the mounting flange sidewall 112 and can provide a top and/or bottom lip, for example at a 45 degree angle, to engage mounting bracket 200.

Figure 33:
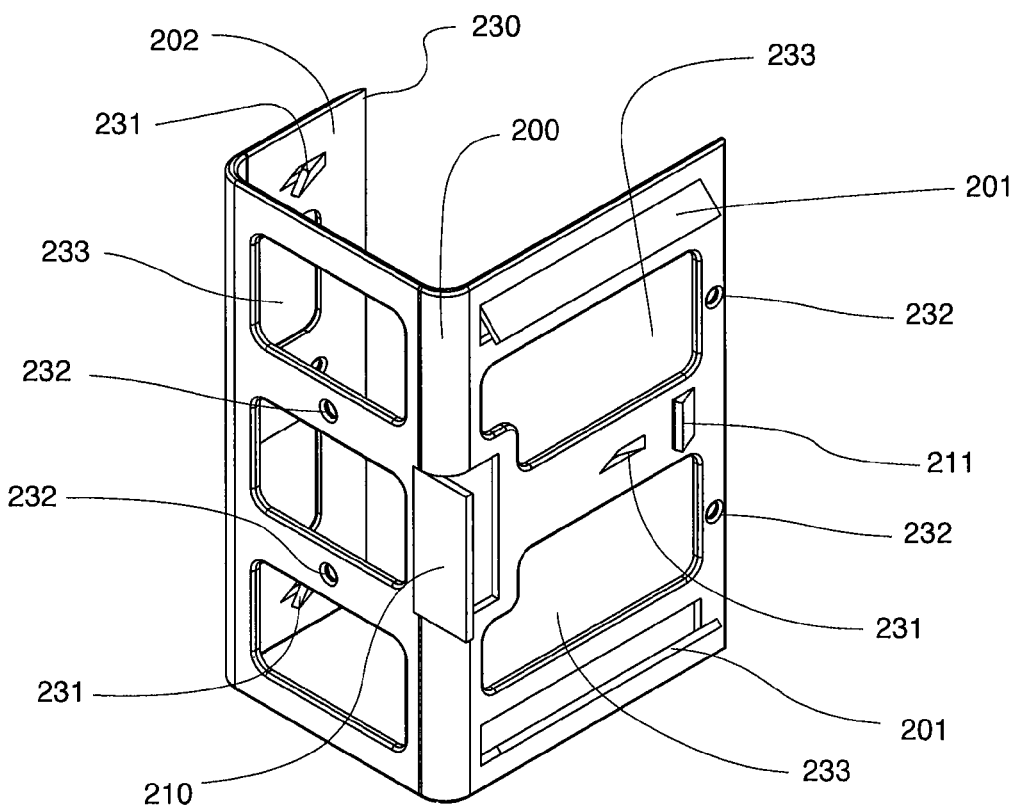
FIG. 33 is a right frontal perspective view of a mounting device according to an embodiment of the present invention.
Figure 34:
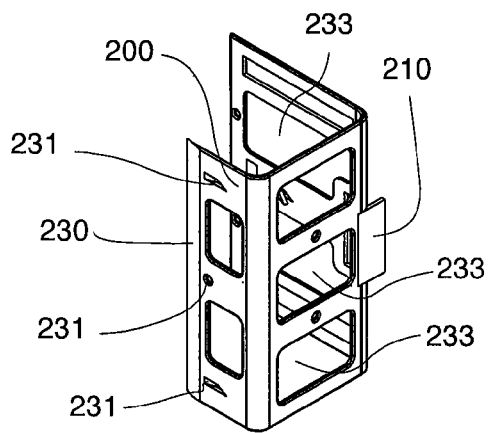
FIG. 34 is a left frontal view of a mounting device according to an embodiment of the present invention.
Figure 35:
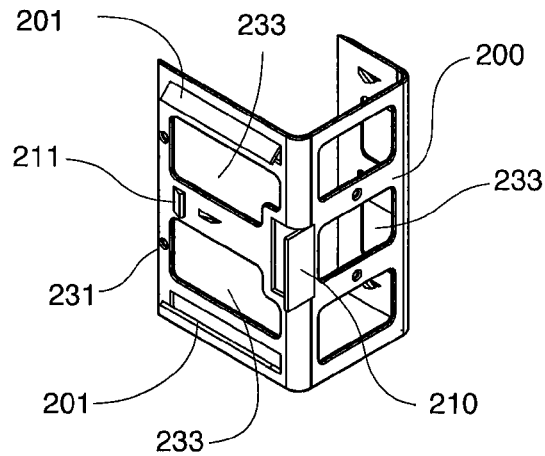
FIG. 35 is a left frontal perspective view of a mounting device turned upside down to accommodate mounting a junction box on the opposite side of a stud according to an embodiment of the present invention.

While there are many methods available to secure the junction box 100 to a stud 299 using known technology, such as adhesives, fasteners, hook and loop material, etc., FIGS. 33, 34, and 35 illustrate the preferred embodiment, which includes mounting bracket 200. Mounting bracket 200 is preferably formed to snap on and straddle stud 299 in a spring like fashion, but can be formed of any similar shape and attached by any known means. A blade edge 230 can be used, when desired, for example to position blade leg 202 of mounting bracket 200 between two ganged supporting studs 299.

In the preferred embodiment, one or more nail sets 231 are stamped into the body of mounting bracket 200 at an angle that will minimize resistance when installed over stud 299, but will set and dig in to supporting stud 299 to resist removal of same. One or more screw holes 232 can provide an alternate means of securing mounting bracket 200 to studs, metal studs, or other devices. Optional excess material cutouts 233 help to minimize weight and material required. The length of the mounting bracket 200 preferably provides added stabilization to the attached junction box 100.

In one embodiment, detents limit movement of an attached junction box. For example, forward stop 210 limits the maximum forward travel of an attached junction box 100 when sliding on mounting bracket rails, and aft stop 211 can prevent excessive aft travel. In one embodiment, aft stop 211 can flex inward towards mounting bracket 200 body to allow mounting bracket 200 to connect with mounting flange 197, and once junction box is in place, aft stop 211 springs back to the extended position to provide a stop. When present, rails 201 and stops 210 and 211 can be any size, shape, or orientation to provide the functionality described. Movement of junction box 100 on mounting bracket rails 201 (or other movement devices) facilitates alignment of junction box 100 with the exterior wall surface once installed.

Flex Tabs

In the preferred embodiment, a flex tab 196 as seen in FIG. 2 is formed as an integral part of junction box 100 during the initial injection molding process. Flex tab 196 can be a projection or arm designed to stabilize junction box 100 by resisting or restricting forward movement relative to the wallboard or sheetrock. The flex tabs 196 provide resistance during automatic wall surface alignment. Flex tab 106, which can also be separately attached, can be any size or shape to provide the desired resistance, and can be made up of multiple components, including springs.

Figure 36:
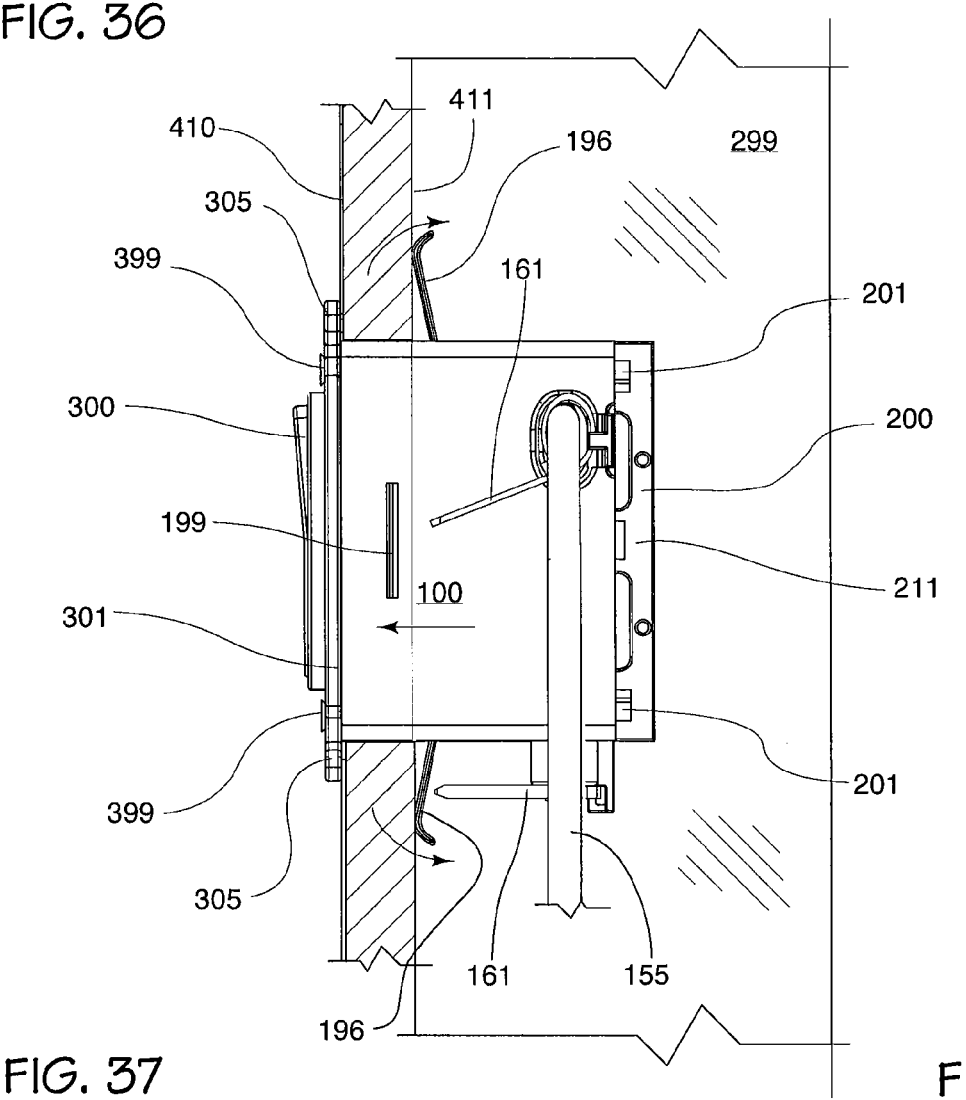
FIG. 36 is a profile view of a box and switch assembly self-adjusting in a wall cavity according to an embodiment of the present invention.

Referring now to the embodiment in FIG. 36, when the wall surface (e.g., sheet rock) is installed, junction box 100 can move to aft stop 211 on mounting bracket 200, out of harms way. When it is time to install electrical device assembly 70, securing devices 399 engage junction box 100 and draw it forward in the direction of the straight motion arrow. As electrical device assembly 70 and junction box 100 are drawn together, strap ears 305 or the like make contact with wallboard exterior surface 410 causing junction box 100 to be drawn toward mounting strap 301 or other outer component. Junction box 100 moves, such as along mounting bracket rails 201, as securing devices 399 are rotated until it contacts the rear of mounting strap 301. Flex tabs 196 engage wallboard interior surface 411 and flex or rotate in the direction of the curved motion arrows, as necessary, providing resistance and stability to power distribution system 50.

Electrical Device Assembly

As shown in the embodiments of FIGS. 18, 20, 23A, and 23B, each electrical device 300, which is sometimes part of electrical device assembly 70, preferably has a mounting strap 301, which may be separate or integral to device 300. In these embodiments, the corners on the top and bottom of each mounting strap 301 can have mounting strap ears 305. Each mounting strap 301 preferably has a top and bottom mounting strap hole 302. Each mounting strap hole 302 is preferably precisely spaced to mate with the top and bottom threaded hole 195 of each bay 109, and this spacing matches and aligns with the current industry standard spacing requirements. Alternatively, mounting strap 301 may be part of cowling 310.

As shown in the embodiment of FIG. 36, when electrical device 300 is inserted into bay 109, it can be secured to or brought near junction box 100. When mounting strap ears 305 of mounting strap 301 make contact with wallboard exterior surface 410, movement of the electrical device 300 is generally halted and continued rotation of securing device 399 draws junction box 100 towards electrical device 300 forcing junction box 100 to slide along the mounting bracket rails 201. Flex tabs 196 make contact with wallboard interior surface 411, and preferably rounded surfaces allow tabs 196 to deflect and slide against wallboard interior surface 411, pivoting in the direction indicated by curved motion arrows. In this embodiment, the resulting compression of the wallboard between mounting strap ears 305 and flex tabs 196 provides stabilization of junction box assembly 60 and flush positioning of junction box 100 with the wallboard exterior surface 410.

Electrical Switches and Devices

In the preferred embodiment, the standardized location of each contact port 125 within every bay 109, allows various electrical device assemblies 70 to be designed or modified to take advantage of the resulting standardized interface presentation. In accordance with certain embodiments of the invention, a common household electrical switch, receptacle, dimmer, timer, fan control, or the like, of known technology, herein referred to as electrical device 300, can be incorporated into electrical device assembly 70 with minor modification, as long as the portions of electrical device 300 can be housed (or modified to be housed) within the physical constraints of cowling 310 and meet (or can be modified to meet) the electrical connection requirements of terminal connection devices 320 therein.

Figure 23A:
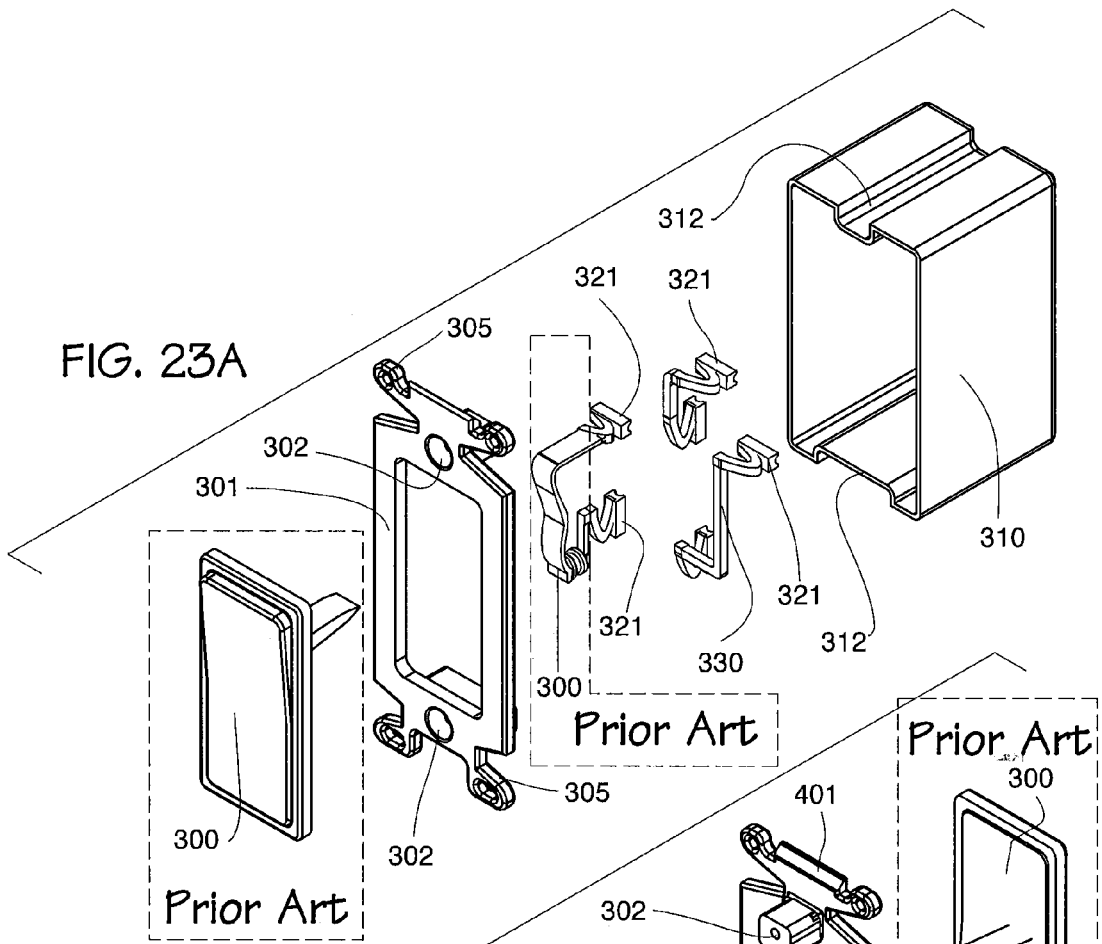
FIG. 23-A is an exploded view of a switch from the right forward perspective according to an embodiment of the present invention.
Figure 23B:
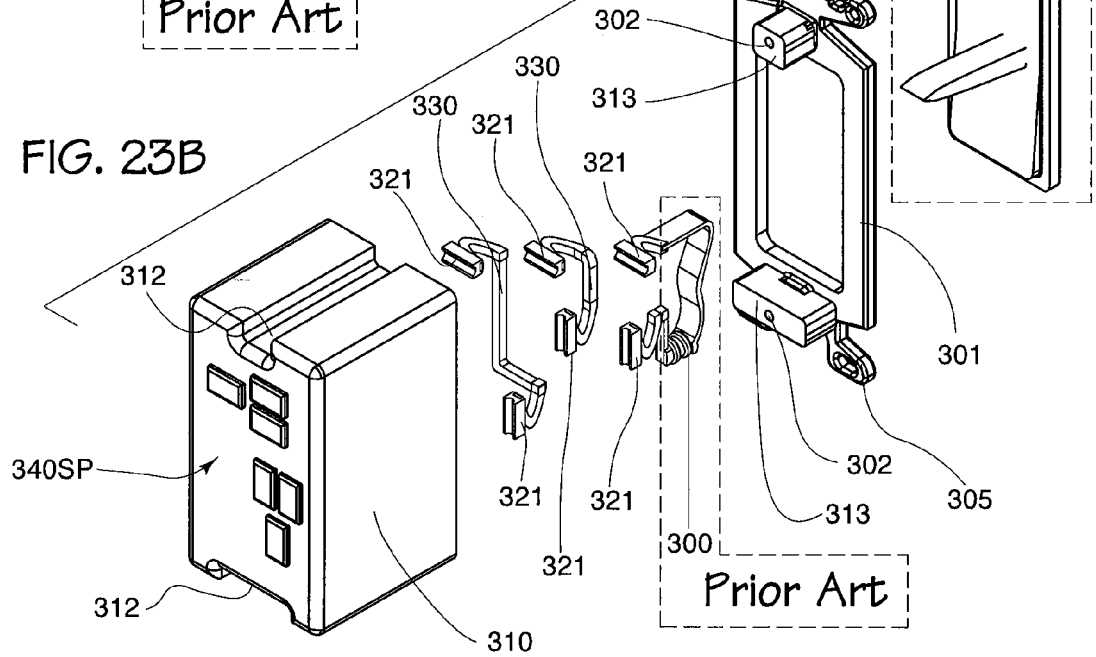

As shown in FIGS. 23A and 23B, cowling 310 can be a shell, cover, or housing preferably comprised of one or more pieces of generally rigid non-conductive material that houses, insulates, envelops, or at least partially surrounds a portion of generic electrical device 300. The cowling 310 is preferably sized to allow for insertion into bay 109 with close-fitting tolerance, thus providing the greatest possible interior volume to accommodate the needed or desired portions of most electrical devices 300 on the market. The preferable close-fitting tolerance also stabilizes and minimizes motion of cowling 310 once placed within bay 109 cavity.

In one embodiment, one or more sides, such as the top and bottom walls of cowling 310, can have a groove, vallecula, or stability alignment groove 312 designed to straddle a corresponding stability alignment spine 194 located in the top and bottom of each bay 109. Preferably, the contrastive widths between the top and the bottom alignment spines 194 ensure proper orientation of cowling 310 and its associated electrical device 300 when inserted into bay 109 of junction box assembly 60. As mentioned, spines and grooves are optional and which side has the spine and groove can change and other alignment or stability protrusions, markers, irregularities, etc. can be used. The interior of cowling 310 can be modified as desired to provide stabilization for the various electrical devices 300 installed therein (not shown). In one embodiment, the forward edge of cowling 310 attaches to the aft side of mounting strap 301.

Terminal Connection Devices

Referring to FIGS. 19, 21, and 22, the rear wall of cowling 310 can provide one or more openings or apertures large enough to allow terminal connection devices 320 (FIG. 22) of the selected electrical device 300 to pass through. Terminal connection devices 320 assure proper contact and physical interface through the use of a conductive brush, clamp, clip, hot tap, or other type of device used for joining electrical circuits. In some embodiments, connector 320 can comprise a device to pierce or penetrate the insulation on a wire in the conduit to establish an electrical connection. In the preferred embodiment a clip 323 capable of receiving varying size wires is shown in FIG. 21. Apertures or openings are arrayed in a pattern complementary to the standardized interface pattern or template presented in every bay 109 of every junction box 100, thereby providing automatic alignment of terminal connection devices 320.

When electrical device assembly 70 is fully inserted into bay 109 of the junction box assembly 60, terminal connection devices 320, or in this example clips 323, extending through their respective openings in the rear wall of the cowling 310 of electrical device assembly 70 are automatically strategically positioned to make terminal connections with the correct respective wires 150 exposed by the contact ports 125 of junction box 100. When electrical device assembly 70 is secured into position, clips 323 make a mechanically engaged connection, as well as a terminal electrical connection with the exposed line conductor, bus bar, or wire 150 presented by contact port 125. This type of terminal connection facilitates a 'plug-and-play' 'hot swappable' connection. Meaning the electrical device assembly 70 can be removed and replaced without having to interrupt the electrical power to junction box assembly 60. The contact ports 125 located in the back of each bay 109 are preferably finger-safe. For example, a homeowner can remove a toggle type SPST switch and replace it with an appropriately rated dimmer switch without removing power from the circuit. There are no wires to strip, twist, or cap. The procedure just requires an exchange of modular components. In this embodiment, the live wires or hot circuit is recessed deep in bay 109, and back into the small openings of the contact ports 125.

A variety of terminal connection devices 320 can be used with this system including brush 321 type contacts as shown in FIGS. 16, 17, 19, and 23. Specific mention of clips 323 and brush 321 type contacts is not intended to limit the invention to these embodiments.

Connection Interfaces

While there are numerous terminal connection interface possibilities in this invention, the preferred embodiment incorporates three primary types of connection interfaces that meet the connection requirements for almost all electrical devices 300.

Figure 30:
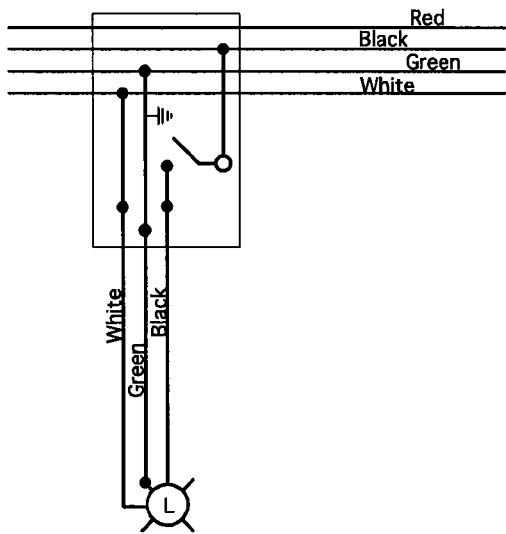
FIG. 30 is a wiring schematic for a SPST switch powering a light according to an embodiment of the present invention.

FIG. 22-SP depicts a SP connection interface 340SP that provides the appropriate terminal connections for single pole electrical devices 300 such as a light switch or receptacle. Referring also to FIG. 30, the SP connection interface 340SP requires terminal connections to input power cable 155, comprised of hot-black wire 150B, green or ground wire 150G, and white or neutral wire 150W. The SP connection interface 340SP also requires terminal connections to control or relay power cable 156, comprised of hot-black wire 150B, green or ground wire 150G, and white or neutral wire 150W. This connection methodology is presented in FIG. 30 showing a simple toggle switch for a light.

Figure 31:
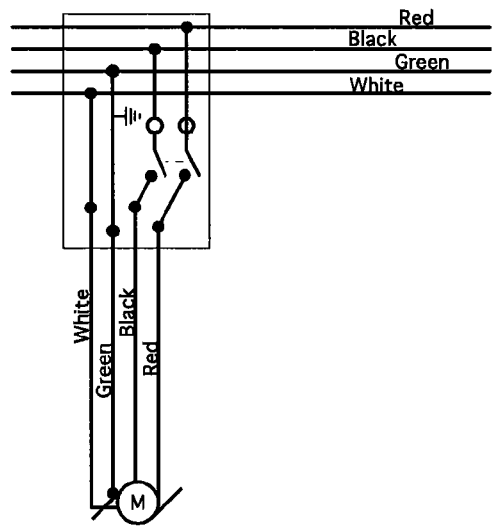
FIG. 31 is a wiring schematic for a DPST switch powering a motor according to an embodiment of the present invention.

FIG. 22DP depicts a DP connection interface 340DP that provides appropriate terminal connections for double pole electrical devices 300. Referring also to FIG. 31, the DP connection interface 340DP requires terminal connections to input power cable 155, comprised of hot-red wire 150R, hot-black wire 150B, green or ground wire 150G, and white or neutral wire 150W. The DP connection interface 340DP also requires terminal connections to the control or relay power cable 156, comprised of hot-red wire 150R, hot-black wire 150B, green or ground wire 150G, and white or neutral wire 150W. This connection methodology is presented in FIG. 31 showing a simple toggle switch for, e.g., a two-phase motor. However, someone skilled in the art can use this DP connection interface 340DP to meet the needs of various electrical devices 300 that require Double Pole Single Throw (DPST), Single Pole Change-over or Single Pole Cross-over (SPCO), Double Throw Double Throw (DPDT), Double pole Cross-over (DPCO), Four-Way Switches, and the like type connections.

A/B Connection Interface

Figure 32:
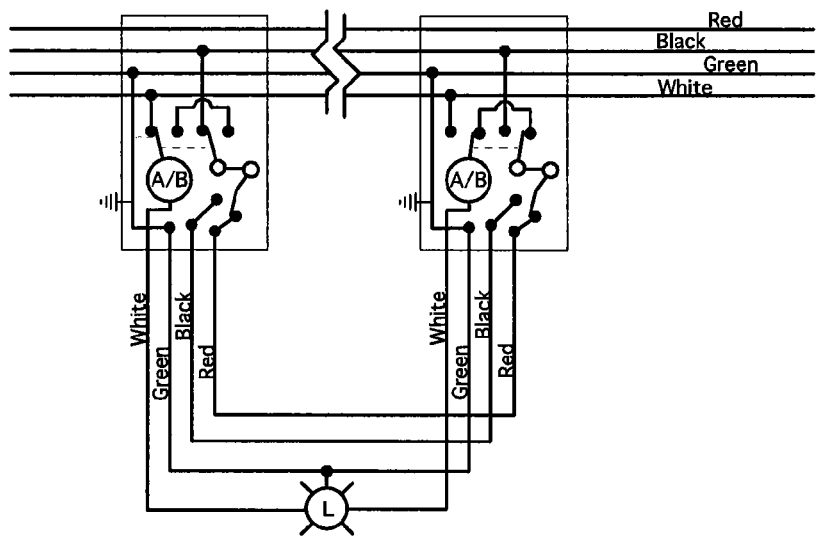
FIG. 32 is a wiring schematic for two three way switches controlling and powering a light according to an embodiment of the present invention.

FIG. 22A/B depicts an A/B connection interface 340AB that incorporates an A/B switch 325 to facilitate multi-way switching. A/B connection interface 340AB provides Single Pole Double Throw Pole (SPDT), Double Pole Single Throw (DPST), Single Pole Change-over or Single Pole Cross-over (SPCO), Double Throw Double Throw (DPDT), Double pole Cross-over (DPCO) connectivity according to the specific wiring requirements of electrical device 300 within each electrical device assembly 70. Referring also to FIG. 32, the A/B connection interface 340AB requires terminal connections to input power cable 155, comprised of hot-red wire 150R, hot-black wire 150B, green or ground wire 150G, and white or neutral wire 150W. The A/B connection interface 340AB also requires terminal connections to the control or relay power cable 156, comprised of hot-red wire 150R, hot-black wire 150B, green or ground wire 150G, and white or neutral wire 150W.

An A/B connection methodology is presented in FIG. 32, showing the simplicity of 3-way switching for a light. Whereas current technology requires cumbersome and sometimes challenging wiring schemes to install and wire three-way and four-way circuits, certain embodiments of this invention simplify this somewhat time consuming and often confusing task. In these embodiments, one of the three-way switches is selected to the 'A' position and the other three-way switch is selected to 'B'. It is literally that simple. The need to wire the switches and/or mark travelers in the field is completely eliminated. To meet the requirements of a four-way switching scheme the installer can simply install a four-way switch, utilizing a DP connection interface 340DP in the center switch position.

The A/B connection interface 340AB can be utilized to standardize complex wiring requirements for a wide range of electrical devices 300. Another example of A/B connection interface 340AB is shown in FIG. 22A/B, whereby a receptacle has the option to connect to either hot-red wire 150R or hot-black wire 150B. This type of load switching or balancing is typically used throughout a home to ensure that appliances do not overload a circuit. In the preferred embodiment the A/B switch 325 is mounted on the face of the receptacle, for the convenience of the end user. A/B switch 325 can also be located on any exterior surface of the cowling 310 or on other surfaces, and the position of the A/B switch 325 will be driven by, e.g., marketing and/or code requirements and should not be considered a limiting factor of this invention.

Figure 18:
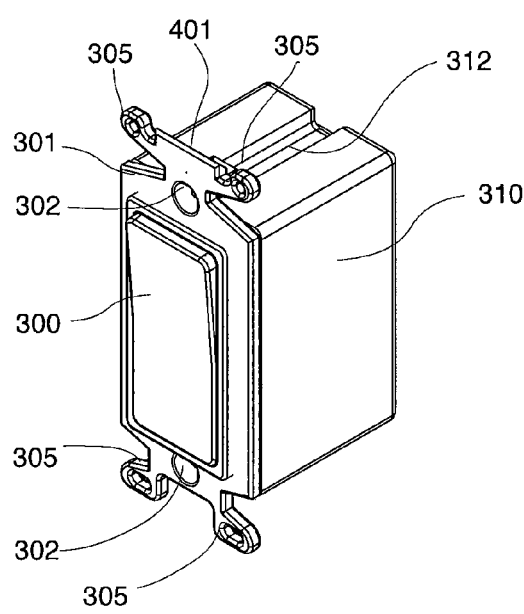
FIG. 18 is a frontal perspective view of a switch according to an embodiment of the present invention.
Figure 20:
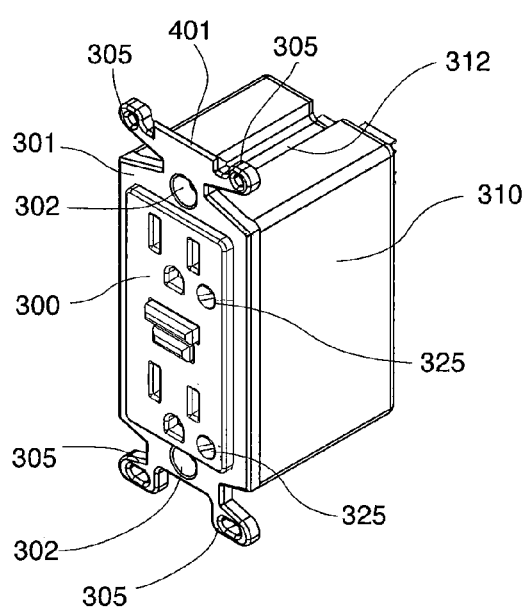
FIG. 20 is a frontal perspective view of a GFCI with A/B switches according to an embodiment of the present invention.

Embodiments of this invention can incorporate at least three phases or series of embodiments of implementation with respect to electrical device assembly 70. A first possible phase or series of embodiments that can incorporate aspects of this invention relates to the development of electrical device assemblies 70 that are designed for this invention. Electrical device assemblies 70 often come from the factory as single-piece modules, each designed for a specific function (SPST, dimmer, fan control rheostat, 3-way switch, etc.). Examples of an electrical device assembly 70 specifically designed for aspects of this invention are shown in FIGS. 18 and 20. FIG. 18 is an example of an all-inclusive SPST switch module and FIG. 20 is a exemplary GFCI receptacle with A/B switching capability individually select hot-black electrical wire 150B or hot-red electrical wire 150R as the power source.

As shown in FIG. 23, exemplary electrical device assemblies 70 designed for aspects of this invention can have a stability alignment key 313 as an integral part of mounting strap 301. Stability alignment key 313 can mate with alignment groove 312 of cowling 310 providing stable connection between mounting strap 301 and cowling 310.

Universal Cowlings

Figure 24:
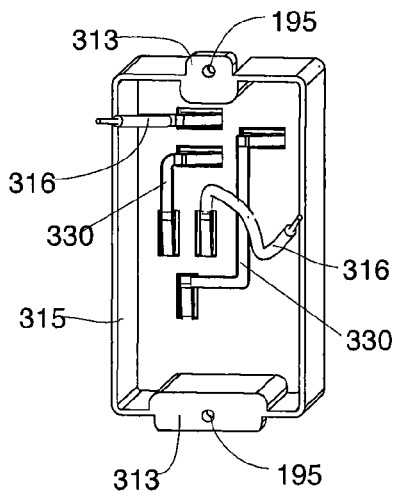
FIG. 24 is a right front perspective view of a universal adaptor cowling according to an embodiment of the present invention.
Figure 25:
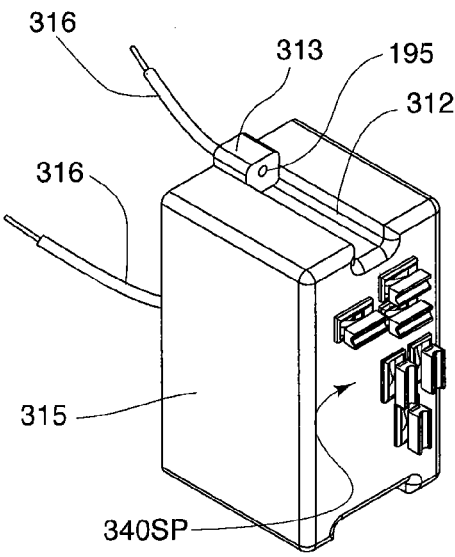
FIG. 25 is a right rear perspective view of a universal adaptor cowling according to an embodiment of the present invention.

A second possible phase or series of embodiments that can incorporate aspects of this invention can include universal cowlings 315 and/or technical expertise to manufacturers to assist them in the modification of their existing product lines. FIGS. 24 and 25 show one embodiment of a universal cowling 315. Universal cowlings 315 can be provided to various manufacturers of electrical devices 300 of known technology. The universal cowlings 315 can be offered in SP connection interface 340SP, DP connection interface 340DP, and A/B connection interface 340AB. In some embodiments, top and/or bottom stability alignment keys 313 can provide a firm point of connection for the manufacturer's mounting strap. In some cases, manufacturers would be allowed to modify their electrical devices 300 to mate with adaptors of the present invention to incorporate the most appropriate terminal connection devices 320 arranged and housed in the most appropriate universal cowling 315 connection interface.

Figure 27:
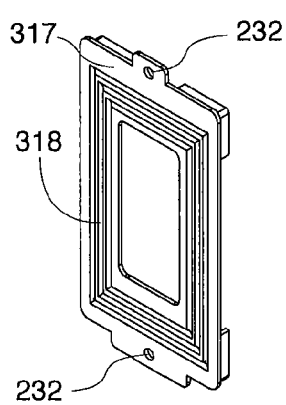
FIG. 27 is a right front perspective view of a universal cowling adaptor plate according to an embodiment of the present invention.
Figure 28:
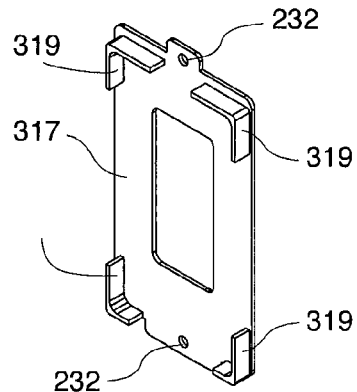
FIG. 28 is a right rear perspective view of a universal cowling adaptor plate according to an embodiment of the present invention.

FIGS. 27 and 28 show an embodiment of a universal cowling adaptor plate 317 that facilitates a better fit and transition between various electrical devices 300 and the universal cowlings 315. The universal cowling adaptor plate 317 can have break-away guides to allow adjustment of the adaptor plate 317 to accept various size electrical devices 300. The universal cowling adaptor plate 317 can have securing tabs 319 that slide into the universal cowlings 315 to ensure a stable fit. In one embodiment, the electrical devices 300, adaptor plate 317, and universal cowling 315 are held together by one or more securing devices 399, which can also secure the assembly to the junction box 100. Of course, numerous adaptors can be envisioned, each to work with an existing electrical device, and the adaptors of the present invention are not limited to any particular configuration as long as they directly or indirectly mate with the universal cowlings 315.

A third possible phase or series of embodiments that can incorporate aspects of this invention can allow field modification of electrical devices 300 currently held in stock and/or participation of specialty devices from manufacturers that do not wish to modify their product line. The third phase can offer the one, two, three, or more universal cowlings 315, as described in phase two, with, e.g., clip 323 and/or brush 321 terminal connection devices 320 attached (preferably preattached) to the cowling 310. In some embodiments, each terminal connection device 320 is secured or attached directly to the cowling 310 and attached to an electrical connection internal bus bar 330, a pre-wired color-coded universal cowling attachment wire 316, or both, as dictated by the needs of the specific electrical device 300 and industry code requirements.

Figure 26:
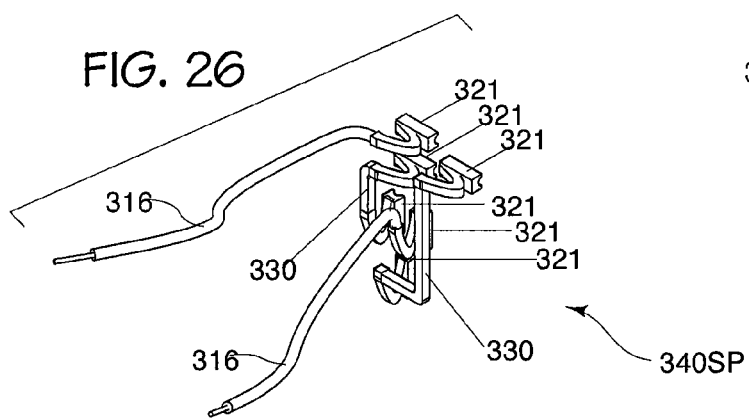
FIG. 26 is an exploded view of a universal adaptor contacts, bus bars, and wires according to an embodiment of the present invention.

For example, referring to FIG. 26, an SPST switch could have the brush 321 for the green or ground wire 150G from the input power cable 155 bused via the ground electrical connection internal bus bar 330 directly to the green or ground wire 150G for the control or relay power cable 156. In addition, one end of a green-coded universal cowling attachment wire 316 can be attached to electrical connection internal bus bar 330 leaving the free end to be attached, using industry standard techniques, to the subject electrical device 300. Further, the hot-black wire 150B from the input power cable 155 can be bussed via the second electrical connection internal bus bar 330 directly to the hot-black wire 150B for the control or relay power cable 156. No connection to the switch is required for the hot-black wire 150B. The brush 321 for the white or neutral wire 150W for both the input power cable 155 and the control or relay power cable 156 have one end of a white-coded universal cowling attachment wire 316 attached to brush 321 leaving the free end to be attached, using industry standard techniques, to the subject electrical device 300.

Of course, as with phase two, there are numerous ways to adapt and connect an existing electrical device to one of the cowlings of the present invention, and all of these adaptive techniques are within the scope of certain embodiments of the invention. While phase three methodology has less labor-savings advantage over conventional wiring practice, it offers an opportunity to use parts in inventory or not yet modified for use with this invention and can be an important aspect to certain embodiments of the invention, such as transitioning to a standard or retrofitting existing devices.

Wall Plates

Figure 37:
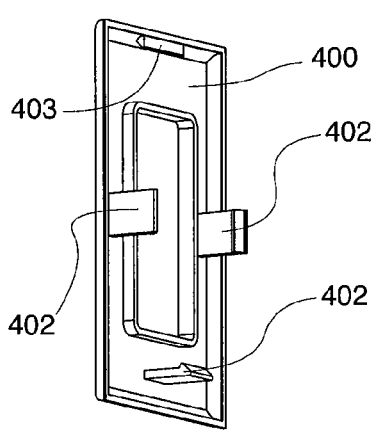
FIG. 37 is a right rear perspective view of a face plate according to an embodiment of the present invention.
Figure 38:
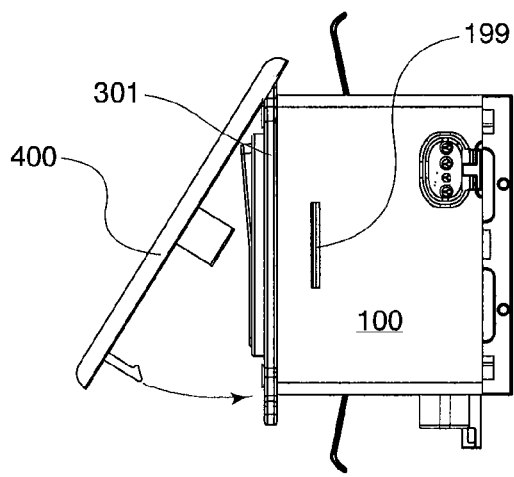
FIG. 38 is a profile view of a face plate being attached to a junction box and electrical device assembly according to an embodiment of the present invention.

As seen in FIGS. 37 and 38, one embodiment of wall plate 400 has an angular cut hinge tab 403 on the upper rear edge that mates with the strap catch 401 on the top of the mounting strap 301. When hinge tab 403 hooks over strap catch 401, the wall plate 400 pivots downward and securing clips 402 engage notch 199 on junction box 100 to hold wall plate 400 in place. Other embodiments do not include hinge tab 403 and/or securing clips 402, or place them in different locations. For example, only one or two securing clips 402 might be included. Clips 402 and hinge tab 403 can be any shape or size. In some embodiments, wall plates 400 can be secured by fastening devices and tab 403 and clips 402 can be omitted.

Weather Proofing

Figure 29:
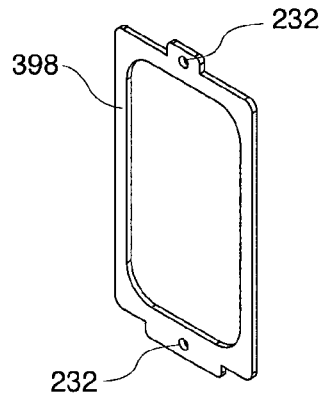
FIG. 29 is a right perspective view of a flexible gasket according to an embodiment of the present invention according to an embodiment of the present invention.

Referring to FIG. 29, optional weatherproofing gasket 398 can provide protection against the elements. For example, gasket 398 may be placed between electrical device 300 and cowling 310, or between wall plate 400 and electrical device 300. In some embodiments, such as shown in FIG. 1, a nipple, such as a water proof or water resistant nipple 159 surrounding or threaded over the wire cable jacket 151 and/or cable entry shield 160, allows the junction box to be protected from the elements.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

While the above description contains many specificities, these should not be construed as limitations on the scope of the invention, but as exemplifications of the presently preferred embodiments thereof. Many other ramifications and variations are possible within the teachings of the invention. As one example, the process for forming the junction box 100 should not be limited to injection molding and the material used need only be insulative in quality. Thus, the scope of the invention should be determined by the appended claims and their legal equivalents, and not by the examples given.

What is claimed is:

1. An electrical apparatus comprising:
    a. a mounting bracket;
    b. a junction box slidably connected to the mounting bracket wherein the junction box further comprises a plurality of hollow channels embedded within a rear wall of the junction box;
    c. an electrical device operatively coupled to the junction box and wherein the electrical device further comprises a conductive connector;
    d. a wall plate that secures the electrical device to the junction box;
    wherein the junction box is a unitary open faced structure, and the plurality of hollow channels embedded within the real wall of the junction box are configured to receive an entry wire;
    wherein the junction box has an aperture at a set location and is configured to expose a non-insulated portion of the entry wire so that the electrical device can receive a modular connection;
    wherein the modular connection is made between the exposed non-insulated portion of entry wire and the conductive connector via a terminal connection device.

2. The electrical apparatus of claim 1, wherein each of said channels has an entry point capable of securing the entry wire.

3. The electrical apparatus of claim 2, further comprising at least one horizontal channel, wherein the entry point is through the side of the rear wall.

4. The electrical apparatus of claim 2, further comprising at least one vertical channel, wherein the entry point is through bottom of the rear wall.

5. The electrical apparatus of claim 2, wherein a portion of at least one of the channels has a void which exposes a portion of insulated wire.

6. The electrical apparatus of claim 1, wherein the conductive connector is in a fixed and standardized location.

7. The electrical apparatus of claim 6, wherein the electrical device further comprises a single pole double throw switch, a double pole single throw switch, a single pole change-over switch, a single pole cross-over switch, double throw double throw switch, or a double pole cross-over switch.

8. The electrical apparatus of claim 1, wherein the wall plate is adapted to overlay the electrical device and configured to fixedly engage the junction box.

9. The electrical apparatus of claim 8, wherein the wall plate fixedly engages the junction box without the use of screws or a sub-plate.

10. The electrical apparatus of claim 1, wherein the mounting bracket comprising a front face, a first side face and a second side face.

11. The electrical apparatus claim 10, wherein the first side face and the second side face connect with the front face to form a ninety degree angle.

12. The electrical apparatus of claim 11, wherein at least the first side face comprises a means for securing the mounting bracket to a wall stud and wherein the first side face comprises on its exterior side a means for slidably mounting the junction box.

13. The electrical apparatus of claim 10, wherein the mounting bracket comprises a front detent and a rear detent configured to bound the slidable movement of the junction box.

* * * * *